(12) United States Patent
Sadek et al.

(10) Patent No.: US 10,484,992 B2
(45) Date of Patent: Nov. 19, 2019

(54) CHANNEL RESERVATION FOR MULTI-USER SCHEDULING

(71) Applicant: QUALCOMM Incorporated, San Diego, CA (US)

(72) Inventors: Ahmed Kamel Sadek, San Diego, CA (US); Tamer Kadous, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 15/791,161

(22) Filed: Oct. 23, 2017

(65) Prior Publication Data

US 2018/0295622 A1    Oct. 11, 2018

Related U.S. Application Data

(60) Provisional application No. 62/481,790, filed on Apr. 5, 2017.

(51) Int. Cl.
| | |
|---|---|
| *H04W 16/14* | (2009.01) |
| *H04W 72/04* | (2009.01) |
| *H04W 72/08* | (2009.01) |
| *H04B 17/309* | (2015.01) |

(52) U.S. Cl.
CPC ....... *H04W 72/0453* (2013.01); *H04W 16/14* (2013.01); *H04W 72/082* (2013.01); *H04B 17/309* (2015.01); *H04W 72/0406* (2013.01)

(58) Field of Classification Search
CPC . H04W 16/14; H04W 72/04; H04W 72/0406; H04W 72/0453; H04W 72/08; H04W 72/082
See application file for complete search history.

(56) References Cited

U.S. PATENT DOCUMENTS

| | | | |
|---|---|---|---|
| 9,451,554 B1 * | 9/2016 | Singh | H04W 52/146 |
| 2011/0002314 A1 * | 1/2011 | Choi | H04W 84/045 |
| | | | 370/338 |

(Continued)

OTHER PUBLICATIONS

International Search Report and Written Opinion—PCT/US2018/020445—ISA/EPO—dated Jul. 13, 2018.

(Continued)

*Primary Examiner* — Jean A Gelin
(74) *Attorney, Agent, or Firm* — Holland & Hart LLP

(57) ABSTRACT

Techniques are described herein to selectively protect some resources of a transmission opportunity, but not all resources of a transmission opportunity. A base station may schedule resources to be used to communicate data with a user equipment (UE). To indicate to potential interference sources, a silencing message may broadcast to other network entities. The silencing message may include an indication of resources to be protected for a transmission between the base station and the UE. The silencing message may indicate a subset of resources that is less than a set of all resources of a transmission opportunity. In some examples, the silencing message may indicate a subset of frequency subbands of the transmission opportunity. In response to the silencing message, potential interference sources may refrain from communicating data during the indicated subset of resources.

22 Claims, 16 Drawing Sheets

(56) References Cited

U.S. PATENT DOCUMENTS

| | | | | |
|---|---|---|---|---|
| 2013/0267230 | A1* | 10/2013 | Lin | H04W 24/02 455/436 |
| 2014/0128115 | A1* | 5/2014 | Siomina | H04L 1/0015 455/501 |
| 2015/0057011 | A1* | 2/2015 | Di Girolamo | H04W 74/0808 455/454 |
| 2016/0189167 | A1* | 6/2016 | Smith | G06Q 30/018 705/37 |
| 2017/0071002 | A1* | 3/2017 | Wells | H04W 52/0219 |
| 2017/0155710 | A1* | 6/2017 | Quinn | H04L 67/1014 |

OTHER PUBLICATIONS

Nokia, et al., "Network-Based Inter-Cell Interference Coordination", 3GPP Draft; R1-165379, 3rd Generation Partnership Project (3GPP), Mobile Competence Centre; 650, Route Des Lucioles; F-06921 Sophia-Antipolis Cedex; France, vol. RAN WG1, No. Nanjing, P.R. China; May 23, 2016-May 27, 2016, May 13, 2016 (May 13, 2016), 5 Pages, XP051096645, Retrieved from the Internet: URL: http://www.3gpp.org/ftp/tsg_ran/WG1_RL1/TSGR1_85/Docs/ [retrieved on May 13, 2016].

Nokia, et al., "Non-Coherent Multi-Node Transmission for URLLC in the SG New Radio", 3GPP Draft; R1-1612841, 3rd Generation Partnership Project (3GPP), Mobile Competence Centre; 650, Route Des Lucioles; F-06921 Sophia-Antipolis Cedex; France, vol. RAN WG1, No. Reno, U.S.A.; Nov. 14, 2016-Nov. 18, 2016, Nov. 13, 2016 (Nov. 13, 2016), 4 Pages, XP051176783, Retrieved from the Internet: URL: http://www.3gpp.org/ftp/Meetings_3GPP_SYNC/RAN1/Docs/ [retrieved on Nov. 2016, Partial International Search Report—PCT/US2018/020445—ISA/EPO—dated May 16, 2018.

* cited by examiner

CHANNEL RESERVATION FOR MULTI-USER SCHEDULING

CROSS REFERENCES

The present application for patent claims priority to U.S. Provisional Patent Application No. 62/481,790 by Sadek, et al., entitled "Channel Reservation For Multi-User Scheduling," filed Apr. 5, 2017, assigned to the assignee hereof, and which is hereby expressly incorporated by reference herein in its entirety.

BACKGROUND

The following relates generally to wireless communication, and more specifically to channel reservation for multi-user scheduling.

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include code division multiple access (CDMA) systems, time division multiple access (TDMA) systems, frequency division multiple access (FDMA) systems, and orthogonal frequency division multiple access (OFDMA) systems, (e.g., a Long Term Evolution (LTE) system, or a New Radio (NR) system). A wireless multiple-access communications system may include a number of base stations or access network nodes, each simultaneously supporting communication for multiple communication devices, which may be otherwise known as user equipment (UE).

In some cases, wireless devices may communicate information using a shared radio frequency (RF) spectrum band (e.g., an unlicensed RF spectrum band). However, communications in a shared band may be subject to interference that may cause transmissions to fail. Some procedures to mitigate interference in a shared band may cause an inefficient use of shared band resources.

SUMMARY

The described techniques relate to improved methods, systems, devices, or apparatuses that support channel reservation for multi-user scheduling. Generally, the described techniques provide for selectively protecting some, but not all, resources of a transmission opportunity. A base station may schedule resources to be used to transmit data to a UE. To silence potential interference sources, the base station may broadcast a silencing message to other network entities. The silencing message may include an indication of the scheduled resources to be protected for the transmission from the base station to the UE. The silencing message may indicate a subset of resources that is less than a set of all resources of a transmission opportunity. In some examples, the silencing message may indicate a subset of frequency subbands of the transmission opportunity. In response to the silencing message, potential interference sources may refrain from communicating data during the indicated subset of resources.

A method of wireless communication is described. The method may include identifying resources of a shared radio frequency spectrum band to use to transmit data to a user equipment (UE), identifying an interference source based at least in part on the identified resources, and broadcasting, via the shared radio frequency spectrum band, a targeted preamble comprising an instruction configured to silence the interference source during a transmission of the data to the UE using the identified resources, the instruction comprising an indication of the interference source and the identified resources.

An apparatus for wireless communication is described. The apparatus may include means for identifying resources of a shared radio frequency spectrum band to use to transmit data to a UE, means for identifying an interference source based at least in part on the identified resources, and means for broadcasting, via the shared radio frequency spectrum band, a targeted preamble comprising an instruction configured to silence the interference source during a transmission of the data to the UE using the identified resources, the instruction comprising an indication of the interference source and the identified resources.

Another apparatus for wireless communication is described. The apparatus may include a processor, memory in electronic communication with the processor, and instructions stored in the memory. The instructions may be operable to cause the processor to identify resources of a shared radio frequency spectrum band to use to transmit data to a UE, identify an interference source based at least in part on the identified resources, and broadcast, via the shared radio frequency spectrum band, a targeted preamble comprising an instruction configured to silence the interference source during a transmission of the data to the UE using the identified resources, the instruction comprising an indication of the interference source and the identified resources.

A non-transitory computer readable medium for wireless communication is described. The non-transitory computer-readable medium may include instructions operable to cause a processor to identify resources of a shared radio frequency spectrum band to use to transmit data to a UE, identify an interference source based at least in part on the identified resources, and broadcast, via the shared radio frequency spectrum band, a targeted preamble comprising an instruction configured to silence the interference source during a transmission of the data to the UE using the identified resources, the instruction comprising an indication of the interference source and the identified resources.

Some examples of the method, apparatus, and non-transitory computer-readable medium described above may further include processes, features, means, or instructions for receiving a quality message from the UE that includes a plurality of signal parameters for a plurality of frequency subbands measured by the UE.

Some examples of the method, apparatus, and non-transitory computer-readable medium described above may further include processes, features, means, or instructions for selecting a respective signal parameter from the plurality of signal parameters measured by the UE that corresponds to the identified resources, wherein identifying the interference source may be based at least in part on the respective signal parameter measured by the UE.

In some examples of the method, apparatus, and non-transitory computer-readable medium described above, the identified resources included in the targeted preamble indicate a subset of frequency resources different from frequency resources used to broadcast the targeted preamble.

In some examples of the method, apparatus, and non-transitory computer-readable medium described above, identifying the resources further comprises: selecting a subset of resources associated with a transmission opportunity, wherein the subset of resources may be less than a set of all resources associated with the transmission opportunity.

In some examples of the method, apparatus, and non-transitory computer-readable medium described above, identifying the resources further comprises: selecting a subset of frequency resources associated with a transmission opportunity, wherein the subset of frequency resources may be less than a set of all frequency resources associated with the transmission opportunity.

Some examples of the method, apparatus, and non-transitory computer-readable medium described above may further include processes, features, means, or instructions for another UE may be scheduled to use at least a portion of resources associated with a transmission opportunity, wherein the portion of resources may be different from the resources of the transmission opportunity used by the UE to receive data.

Some examples of the method, apparatus, and non-transitory computer-readable medium described above may further include processes, features, means, or instructions for transmitting the data to the UE using the identified resources.

A method of wireless communication is described. The method may include measuring, by a UE, a plurality of signal parameters for a plurality of frequency subbands in a shared radio frequency spectrum band received by the UE, transmitting a quality message that includes the plurality of signal parameters measured by the UE, and receiving, via the shared radio frequency spectrum band, a targeted preamble that indicates resources to be used by the UE to communicate data, wherein the targeted preamble comprises an instruction configured to silence an interference source during a transmission of data to the UE using the resources, the instruction comprising an indication of the interference source and the identified resources.

An apparatus for wireless communication is described. The apparatus may include means for measuring, by a UE, a plurality of signal parameters for a plurality of frequency subbands in a shared radio frequency spectrum band received by the UE, means for transmitting a quality message that includes the plurality of signal parameters measured by the UE, and means for receiving, via the shared radio frequency spectrum band, a targeted preamble that indicates resources to be used by the UE to communicate data, wherein the targeted preamble comprises an instruction configured to silence an interference source during a transmission of data to the UE using the resources, the instruction comprising an indication of the interference source and the identified resources.

Another apparatus for wireless communication is described. The apparatus may include a processor, memory in electronic communication with the processor, and instructions stored in the memory. The instructions may be operable to cause the processor to measure, by a UE, a plurality of signal parameters for a plurality of frequency subbands in a shared radio frequency spectrum band received by the UE, transmit a quality message that includes the plurality of signal parameters measured by the UE, and receive, via the shared radio frequency spectrum band, a targeted preamble that indicates resources to be used by the UE to communicate data, wherein the targeted preamble comprises an instruction configured to silence an interference source during a transmission of data to the UE using the resources, the instruction comprising an indication of the interference source and the identified resources.

A non-transitory computer readable medium for wireless communication is described. The non-transitory computer-readable medium may include instructions operable to cause a processor to measure, by a UE, a plurality of signal parameters for a plurality of frequency subbands in a shared radio frequency spectrum band received by the UE, transmit a quality message that includes the plurality of signal parameters measured by the UE, and receive, via the shared radio frequency spectrum band, a targeted preamble that indicates resources to be used by the UE to communicate data, wherein the targeted preamble comprises an instruction configured to silence an interference source during a transmission of data to the UE using the resources, the instruction comprising an indication of the interference source and the identified resources.

Some examples of the method, apparatus, and non-transitory computer-readable medium described above may further include processes, features, means, or instructions for identifying the interference source associated with the UE based at least in part on the plurality of signal parameters.

Some examples of the method, apparatus, and non-transitory computer-readable medium described above may further include processes, features, means, or instructions for transmitting the data using the identified resources.

In some examples of the method, apparatus, and non-transitory computer-readable medium described above, the quality message may be a resource response message.

In some examples of the method, apparatus, and non-transitory computer-readable medium described above, the resources include a subset of resources that may be less than a set of all resources associated with a transmission opportunity.

In some examples of the method, apparatus, and non-transitory computer-readable medium described above, the resources include a subset of frequency resources that may be less than a set of all frequency resources associated with a transmission opportunity.

Some examples of the method, apparatus, and non-transitory computer-readable medium described above may further include processes, features, means, or instructions for another UE may be scheduled to use at least a portion of resources associated with a transmission opportunity, wherein the portion of resources may be different from the resources of the transmission opportunity used by the UE to receive data.

A method of wireless communication is described. The method may include receiving a resource request message from a base station, identifying a subset of resources of a transmission opportunity included in the resource request message to be used for receiving data from the base station, and broadcasting a resource response message to a potential interference source indicating the subset of resources to be used for receiving data from the base station.

An apparatus for wireless communication is described. The apparatus may include means for receiving a resource request message from a base station, means for identifying a subset of resources of a transmission opportunity included in the resource request message to be used for receiving data from the base station, and means for broadcasting a resource response message to a potential interference source indicating the subset of resources to be used for receiving data from the base station.

Another apparatus for wireless communication is described. The apparatus may include a processor, memory in electronic communication with the processor, and instructions stored in the memory. The instructions may be operable to cause the processor to receive a resource request message from a base station, identify a subset of resources of a transmission opportunity included in the resource request message to be used for receiving data from the base station, and broadcast a resource response message to a potential interference source indicating the subset of resources to be used for receiving data from the base station.

A non-transitory computer readable medium for wireless communication is described. The non-transitory computer-readable medium may include instructions operable to cause a processor to receive a resource request message from a base station, identify a subset of resources of a transmission opportunity included in the resource request message to be used for receiving data from the base station, and broadcast a resource response message to a potential interference source indicating the subset of resources to be used for receiving data from the base station.

In some examples of the method, apparatus, and non-transitory computer-readable medium described above, the resource response message includes a subset of frequency resources of the transmission opportunity for communication with the base station.

Some examples of the method, apparatus, and non-transitory computer-readable medium described above may further include processes, features, means, or instructions for determining a bitmap value of the subset of resources, wherein the resource response message includes the bitmap value indicating the subset of resources.

Some examples of the method, apparatus, and non-transitory computer-readable medium described above may further include processes, features, means, or instructions for receiving data from the base station using the subset of resources.

In some examples of the method, apparatus, and non-transitory computer-readable medium described above, the subset of resources may be less than a set of all resources associated with the transmission opportunity.

Some examples of the method, apparatus, and non-transitory computer-readable medium described above may further include processes, features, means, or instructions for another UE may be scheduled to use at least a portion of resources associated with the transmission opportunity, wherein the portion of resources may be different from the resources of the transmission opportunity used by the UE to receive data.

In some examples of the method, apparatus, and non-transitory computer-readable medium described above, the subset of resources included in the resource response message indicate a subset of frequency resources different from frequency resources used to broadcast the resource response message.

A method of wireless communication is described. The method may include receiving, by a network entity, a resource response message from a UE, identifying a subset of frequency resources of a transmission opportunity included in the resource response message to be used by the UE to communicate data, wherein the subset of frequency resources is less than a set of all resources associated with the transmission opportunity, and refraining from transmitting data using the subset of frequency resources included in the resource response message.

An apparatus for wireless communication is described. The apparatus may include means for receiving, by a network entity, a resource response message from a UE, means for identifying a subset of frequency resources of a transmission opportunity included in the resource response message to be used by the UE to communicate data, wherein the subset of frequency resources is less than a set of all resources associated with the transmission opportunity, and means for refraining from transmitting data using the subset of frequency resources included in the resource response message.

Another apparatus for wireless communication is described. The apparatus may include a processor, memory in electronic communication with the processor, and instructions stored in the memory. The instructions may be operable to cause the processor to receive, by a network entity, a resource response message from a UE, identify a subset of frequency resources of a transmission opportunity included in the resource response message to be used by the UE to communicate data, wherein the subset of frequency resources is less than a set of all resources associated with the transmission opportunity, and refrain from transmitting data using the subset of frequency resources included in the resource response message.

A non-transitory computer readable medium for wireless communication is described. The non-transitory computer-readable medium may include instructions operable to cause a processor to receive, by a network entity, a resource response message from a UE, identify a subset of frequency resources of a transmission opportunity included in the resource response message to be used by the UE to communicate data, wherein the subset of frequency resources is less than a set of all resources associated with the transmission opportunity, and refrain from transmitting data using the subset of frequency resources included in the resource response message.

Some examples of the method, apparatus, and non-transitory computer-readable medium described above may further include processes, features, means, or instructions for comparing the subset of frequency resources to a scheduled resources to be used by the network entity to communicate data, wherein refraining from transmitting data may be based at least in part on the subset of frequency resources overlapping with the scheduled resources.

Some examples of the method, apparatus, and non-transitory computer-readable medium described above may further include processes, features, means, or instructions for determining a bitmap value from information included in the resource response message, wherein identifying the subset of frequency resources may be based at least in part on the bitmap value.

In some examples of the method, apparatus, and non-transitory computer-readable medium described above, the network entity may be scheduled to use at least a portion of frequency resources associated with the transmission opportunity, wherein the portion of frequency resources may be different from the resources of the transmission opportunity used by the UE to receive data.

DETAILED DESCRIPTION

In some shared radio frequency (RF) spectrum bands, potential interference sources may be silenced to ensure link quality during a transmission of data. In wireless communications systems where multiple users may use the same transmission opportunity, some silencing procedures may cause some user equipments (UEs) to refrain from transmitting even though their communications would not interfere with the transmission that is protected by the silencing procedures. For example, if a first UE is scheduled to receive data using a first frequency subband of a transmission opportunity and a second UE is scheduled to receive data using a second frequency subband different from the first frequency subband of the transmission opportunity, a silencing procedure may silence all both subbands for the transmission opportunity, even though the communications of the second UE may not need to be silenced. As such, some silencing procedures for shared bands may be lead to inefficient spectrum use in systems where multiple users may be scheduled during the same transmission opportunity.

Techniques are described herein to selectively protect some resources of a transmission opportunity, but not all resources of a transmission opportunity. A base station may schedule resources to be used to communicate data with a UE. To indicate to potential interference sources, a silencing message may broadcast to other network entities. The silencing message may include an indication of resources to be protected for a transmission between the base station and the UE. The silencing message may indicate a subset of resources that is less than a set of all resources of a transmission opportunity. In some examples, the silencing message may indicate a subset of frequency subbands of the transmission opportunity. In response to the silencing message, potential interference sources may refrain from communicating data during the indicated subset of resources.

Aspects of the disclosure are initially described in the context of a wireless communications system. Aspects of the disclosure are illustrated by and described with reference to communication scheme diagrams that relate to channel reservation for multi-user scheduling. Aspects of the disclosure are further illustrated by and described with reference to apparatus diagrams, system diagrams, and flowcharts that relate to channel reservation for multi-user scheduling.

Figure 1:
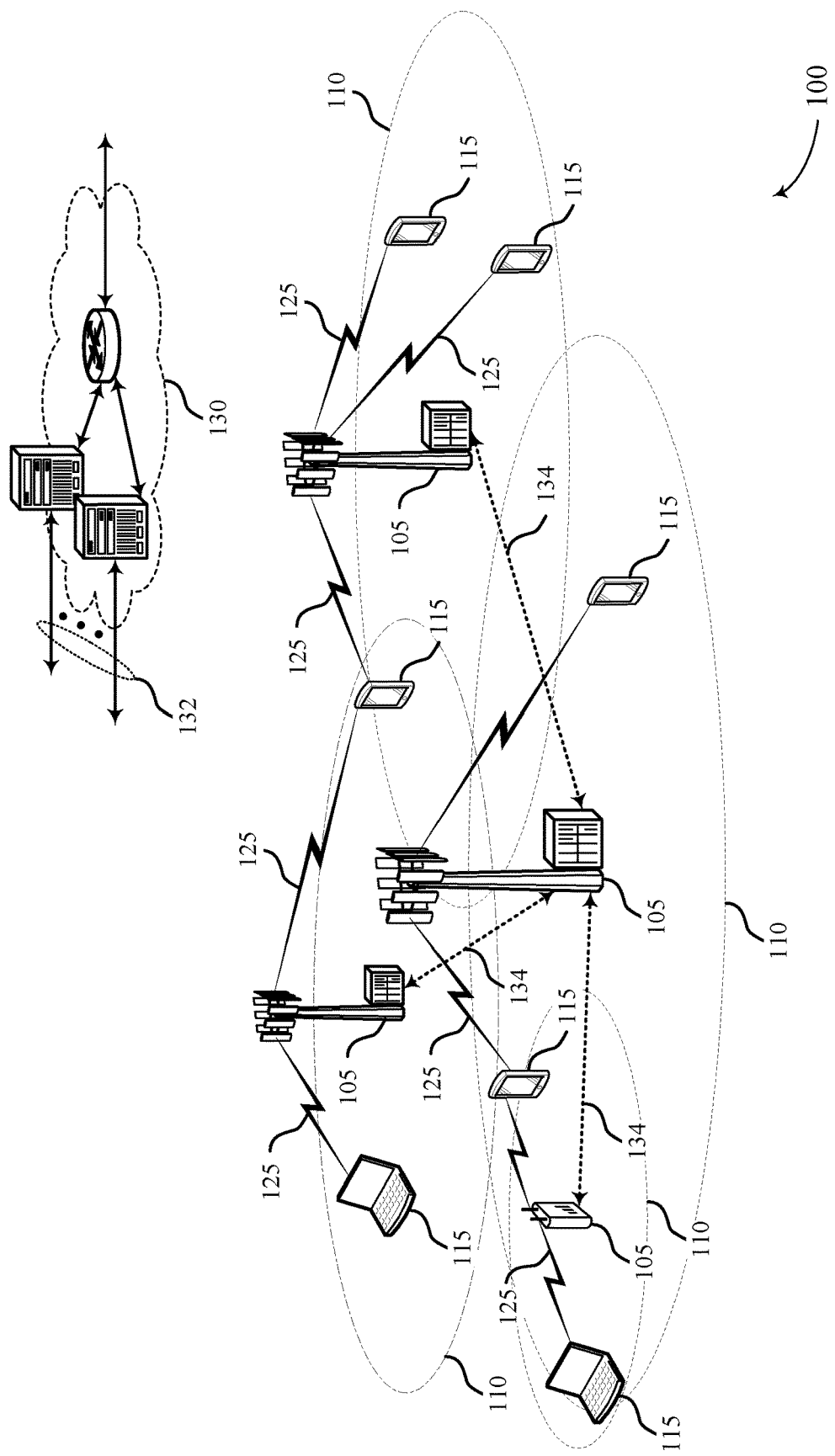
FIG. 1 illustrates an example of a system for wireless communication that supports channel reservation for multi-user scheduling in accordance with aspects of the present disclosure.

FIG. 1 illustrates an example of a wireless communications system 100 in accordance with various aspects of the present disclosure. The wireless communications system 100 includes base stations 105, UEs 115, and a core network 130. In some examples, the wireless communications system 100 may be a Long Term Evolution (LTE), LTE-Advanced (LTE-A) network, or a New Radio (NR) network. In some cases, wireless communications system 100 may support enhanced broadband communications, ultra-reliable (i.e., mission critical) communications, low latency communications, and communications with low-cost and low-complexity devices. In a shared band, to ensure link quality during a transmission of data, some potential interference sources may be silenced. A silencing message may specifically indicate which resources of a transmission opportunity are to be used for the transmission of data. Potential interference sources that receive the silencing message may refrain from communicating during the indicated resources.

Base stations 105 may wirelessly communicate with UEs 115 via one or more base station antennas. Each base station 105 may provide communication coverage for a respective geographic coverage area 110. Communication links 125 shown in wireless communications system 100 may include uplink transmissions from a UE 115 to a base station 105, or downlink transmissions, from a base station 105 to a UE 115. Control information and data may be multiplexed on an uplink channel or downlink according to various techniques. Control information and data may be multiplexed on a downlink channel, for example, using time division multiplexing (TDM) techniques, frequency division multiplexing (FDM) techniques, or hybrid TDM-FDM techniques. In some examples, the control information transmitted during a transmission time interval (TTI) of a downlink channel may be distributed between different control regions in a cascaded manner (e.g., between a common control region and one or more UE-specific control regions).

UEs 115 may be dispersed throughout the wireless communications system 100, and each UE 115 may be stationary or mobile. A UE 115 may also be referred to as a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology. A UE 115 may also be a cellular phone, a personal digital assistant (PDA), a wireless modem, a wireless communication device, a handheld device, a tablet computer, a laptop computer, a cordless phone, a personal electronic device, a handheld device, a personal computer, a wireless local loop (WLL) station, an Internet of Things (IoT) device, an Internet of Everything (IoE) device, a machine type communication (MTC) device, an appliance, an automobile, or the like.

In some cases, a UE 115 may also be able to communicate directly with other UEs (e.g., using a peer-to-peer (P2P) or device-to-device (D2D) protocol). One or more of a group of UEs 115 utilizing D2D communications may be within the coverage area 110 of a cell. Other UEs 115 in such a group may be outside the coverage area 110 of a cell, or otherwise unable to receive transmissions from a base station 105. In some cases, groups of UEs 115 communicating via D2D communications may utilize a one-to-many (1:M) system in which each UE 115 transmits to every other UE 115 in the group. In some cases, a base station 105 facilitates the scheduling of resources for D2D communications. In other cases, D2D communications are carried out independent of a base station 105.

Some UEs 115, such as MTC or IoT devices, may be low cost or low complexity devices, and may provide for automated communication between machines, i.e., Machine-to-Machine (M2M) communication. M2M or MTC may refer to data communication technologies that allow devices to communicate with one another or a base station without human intervention. For example, M2M or MTC may refer to communications from devices that integrate sensors or meters to measure or capture information and relay that information to a central server or application program that can make use of the information or present the information to humans interacting with the program or application. Some UEs 115 may be designed to collect information or enable automated behavior of machines. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

In some cases, an MTC device may operate using half-duplex (one-way) communications at a reduced peak rate. MTC devices may also be configured to enter a power saving "deep sleep" mode when not engaging in active communications. In some cases, MTC or IoT devices may be designed to support mission critical functions and wireless communications system may be configured to provide ultra-reliable communications for these functions.

Base stations 105 may communicate with the core network 130 and with one another. For example, base stations 105 may interface with the core network 130 through backhaul links 132 (e.g., S1, etc.). Base stations 105 may communicate with one another over backhaul links 134 (e.g., ×2, etc.) either directly or indirectly (e.g., through core network 130). Base stations 105 may perform radio configuration and scheduling for communication with UEs 115, or may operate under the control of a base station controller (not shown). In some examples, base stations 105 may be macro cells, small cells, hot spots, or the like. Base stations 105 may also be referred to as evolved NodeBs (eNBs) 105.

A base station 105 may be connected by an S1 interface to the core network 130. The core network may be an evolved packet core (EPC), which may include at least one mobility management entity (MME), at least one serving gateway (S-GW), and at least one Packet Data Network (PDN) gateway (P-GW). The MME may be the control node that processes the signaling between the UE 115 and the EPC. All user Internet Protocol (IP) packets may be transferred through the S-GW, which itself may be connected to the P-GW. The P-GW may provide IP address allocation as well as other functions. The P-GW may be connected to the network operators IP services. The operators IP services may include the Internet, the Intranet, an IP Multimedia Subsystem (IMS), and a Packet-Switched (PS) Streaming Service.

The core network 130 may provide user authentication, access authorization, tracking, Internet Protocol (IP) connectivity, and other access, routing, or mobility functions. At least some of the network devices, such as base stations 105 may include subcomponents such as an access network entity, which may be an example of an access node controller (ANC). Each access network entity may communicate with a number of UEs 115 through a number of other access network transmission entities, each of which may be an example of a smart radio head, or a transmission/reception point (TRP). In some configurations, various functions of each access network entity or base station 105 may be distributed across various network devices (e.g., radio heads and access network controllers) or consolidated into a single network device (e.g., a base station 105).

Wireless communications system 100 may operate in an ultra-high frequency (UHF) frequency region using frequency bands from 700 MHz to 2600 MHz (2.6 GHz), although some networks (e.g., a wireless local area network (WLAN)) may use frequencies as high as 4 GHz. This region may also be known as the decimeter band, since the wavelengths range from approximately one decimeter to one meter in length. UHF waves may propagate mainly by line of sight, and may be blocked by buildings and environmental features. However, the waves may penetrate walls sufficiently to provide service to UEs 115 located indoors. Transmission of UHF waves is characterized by smaller antennas and shorter range (e.g., less than 100 km) compared to transmission using the smaller frequencies (and longer waves) of the high frequency (HF) or very high frequency (VHF) portion of the spectrum. In some cases, wireless communications system 100 may also utilize extremely high frequency (EHF) portions of the spectrum (e.g., from 30 GHz to 300 GHz). This region may also be known as the millimeter band, since the wavelengths range from approximately one millimeter to one centimeter in length. Thus, EHF antennas may be even smaller and more closely spaced than UHF antennas. In some cases, this may facilitate use of antenna arrays within a UE 115 (e.g., for directional beamforming). However, EHF transmissions may be subject to even greater atmospheric attenuation and shorter range than UHF transmissions.

Thus, wireless communications system 100 may support millimeter wave (mmW) communications between UEs 115 and base stations 105. Devices operating in mmW or EHF bands may have multiple antennas to allow beamforming. That is, a base station 105 may use multiple antennas or antenna arrays to conduct beamforming operations for directional communications with a UE 115. Beamforming (which may also be referred to as spatial filtering or directional transmission) is a signal processing technique that may be used at a transmitter (e.g., a base station 105) to shape and/or steer an overall antenna beam in the direction of a target receiver (e.g., a UE 115). This may be achieved by combining elements in an antenna array in such a way that transmitted signals at particular angles experience constructive interference while others experience destructive interference.

Multiple-input multiple-output (MIMO) wireless systems use a transmission scheme between a transmitter (e.g., a base station 105) and a receiver (e.g., a UE 115), where both transmitter and receiver are equipped with multiple antennas. Some portions of wireless communications system 100 may use beamforming. For example, base station 105 may have an antenna array with a number of rows and columns of antenna ports that the base station 105 may use for beamforming in its communication with UE 115. Signals may be transmitted multiple times in different directions (e.g., each transmission may be beamformed differently). A mmW receiver (e.g., a UE 115) may try multiple beams (e.g., antenna subarrays) while receiving the synchronization signals.

In some cases, the antennas of a base station 105 or UE 115 may be located within one or more antenna arrays, which may support beamforming or MIMO operation. One or more base station antennas or antenna arrays may be collocated at an antenna assembly, such as an antenna tower. In some cases, antennas or antenna arrays associated with a base station 105 may be located in diverse geographic locations. A base station 105 may multiple use antennas or antenna arrays to conduct beamforming operations for directional communications with a UE 115.

In some cases, wireless communications system 100 may be a packet-based network that operate according to a layered protocol stack. In the user plane, communications at the bearer or Packet Data Convergence Protocol (PDCP) layer may be IP-based. A Radio Link Control (RLC) layer may in some cases perform packet segmentation and reassembly to communicate over logical channels. A Medium Access Control (MAC) layer may perform priority handling and multiplexing of logical channels into transport channels. The MAC layer may also use Hybrid ARQ (HARD) to provide retransmission at the MAC layer to improve link efficiency. In the control plane, the Radio Resource Control (RRC) protocol layer may provide establishment, configuration, and maintenance of an RRC connection between a UE 115 and a network device or core network 130 supporting radio bearers for user plane data. At the Physical (PHY) layer, transport channels may be mapped to physical channels.

Time intervals in LTE or NR may be expressed in multiples of a basic time unit (which may be a sampling period of $T_s=1/30,720,000$ seconds). Time resources may be organized according to radio frames of length of 10 ms ($T_f=307200T_s$), which may be identified by a system frame number (SFN) ranging from 0 to 1023. Each frame may include ten 1 ms subframes numbered from 0 to 9. A subframe may be further divided into two 0.5 ms slots, each of which contains 6 or 7 modulation symbol periods (depending on the length of the cyclic prefix prepended to each symbol). Excluding the cyclic prefix, each symbol contains 2048 sample periods. In some cases the subframe may be the smallest scheduling unit, also known as a TTI. In other cases, a TTI may be shorter than a subframe or may be dynamically selected (e.g., in short TTI bursts or in selected component carriers using short TTIs).

A resource element may consist of one symbol period and one subcarrier (e.g., a 15 KHz frequency range). A resource block may contain 12 consecutive subcarriers in the frequency domain and, for a normal cyclic prefix in each orthogonal frequency division multiplexing (OFDM) symbol, 7 consecutive OFDM symbols in the time domain (1 slot), or 84 resource elements. The number of bits carried by each resource element may depend on the modulation scheme (the configuration of symbols that may be selected during each symbol period). Thus, the more resource blocks that a UE receives and the higher the modulation scheme, the higher the data rate may be.

Wireless communications system 100 may support operation on multiple cells or carriers, a feature which may be referred to as carrier aggregation (CA) or multi-carrier operation. A carrier may also be referred to as a component carrier (CC), a layer, a channel, etc. The terms "carrier," "component carrier," "cell," and "channel" may be used interchangeably herein. A UE 115 may be configured with multiple downlink CCs and one or more uplink CCs for carrier aggregation. Carrier aggregation may be used with both frequency division duplexing (FDD) and time division duplexing (TDD) component carriers.

In some cases, wireless communications system 100 may utilize enhanced component carriers (eCCs). An eCC may be characterized by one or more features including: wider bandwidth, shorter symbol duration, shorter TTIs, and modified control channel configuration. In some cases, an eCC may be associated with a carrier aggregation configuration or a dual connectivity configuration (e.g., when multiple serving cells have a suboptimal or non-ideal backhaul link). An eCC may also be configured for use in unlicensed spectrum or shared spectrum (where more than one operator is allowed to use the spectrum). An eCC characterized by wide bandwidth may include one or more segments that may be utilized by UEs 115 that are not capable of monitoring the whole bandwidth or prefer to use a limited bandwidth (e.g., to conserve power).

In some cases, an eCC may utilize a different symbol duration than other CCs, which may include use of a reduced symbol duration as compared with symbol durations of the other CCs. A shorter symbol duration is associated with increased subcarrier spacing. A device, such as a UE 115 or base station 105, utilizing eCCs may transmit wideband signals (e.g., 20, 40, 60, 80 MHz, etc.) at reduced symbol durations (e.g., 16.67 microseconds). A TTI in eCC may consist of one or multiple symbols. In some cases, the TTI duration (that is, the number of symbols in a TTI) may be variable.

A shared radio frequency spectrum band may be utilized in an NR shared spectrum system. For example, an NR shared spectrum may utilize any combination of licensed, shared, and unlicensed spectrums, among others. The flexibility of eCC symbol duration and subcarrier spacing may allow for the use of eCC across multiple spectrums. In some examples, NR shared spectrum may increase spectrum utilization and spectral efficiency, specifically through dynamic vertical (e.g., across frequency) and horizontal (e.g., across time) sharing of resources.

In some cases, wireless communications system 100 may utilize both licensed and unlicensed radio frequency spectrum bands. For example, wireless communications system 100 may employ LTE License Assisted Access (LTE-LAA) or LTE Unlicensed (LTE U) radio access technology or NR technology in an unlicensed band such as the 5 Ghz Industrial, Scientific, and Medical (ISM) band. When operating in unlicensed radio frequency spectrum bands, wireless devices such as base stations 105 and UEs 115 may employ listen-before-talk (LBT) procedures to ensure the channel is clear before transmitting data. In some cases, operations in unlicensed bands may be based on a CA configuration in conjunction with CCs operating in a licensed band. Operations in unlicensed spectrum may include downlink transmissions, uplink transmissions, or both. Duplexing in unlicensed spectrum may be based on FDD, TDD, or a combination of both.

In some examples, the wireless communications system 100 may operate using a shared frequency spectrum band (e.g., unlicensed frequency spectrum band). When operating in the shared band, a variety of interference sources may reduce the quality of a link between a base station 105 and a UE 115. To ensure link quality, in some examples, the wireless communications system 100 may initiate silencing procedures to silence potential interference sources during a transmission opportunity to be used for communicating data between the base station 105 and the UE 115. Techniques are described herein to indicate subsets of resources of a transmission opportunity that are to be protected. By indicating subsets of resources, other entities (non-interfering entities) may continue to communicate using other resources of the transmission opportunity.

Figure 2:
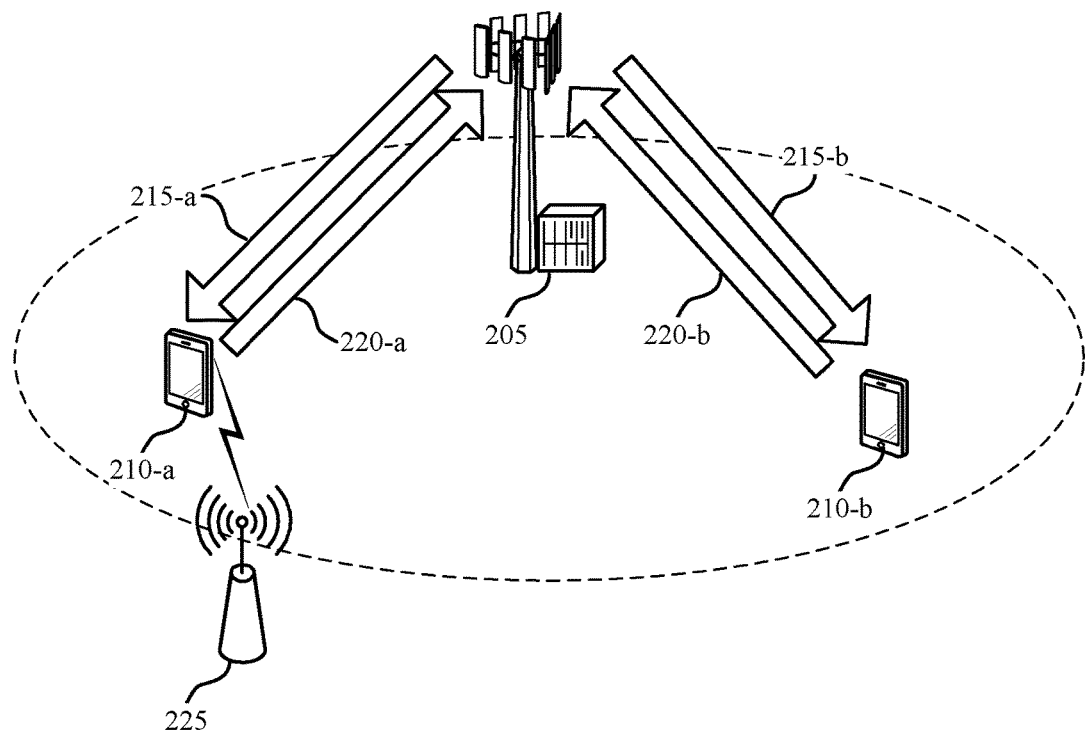
FIG. 2 illustrates an example of a wireless communications system that supports channel reservation for multi-user scheduling in accordance with aspects of the present disclosure.

FIG. 2 illustrates an example of a wireless communications system 200 that supports channel reservation for multi-user scheduling in accordance with various aspects of the present disclosure. In some examples, wireless communications system 200 may implement aspects of wireless communications system 100. The wireless communications system 200 may use a shared RF spectrum band (e.g., unlicensed band). When using a shared RF spectrum band, the wireless communications system 200 may implement a shared radio access technology (RAT) such as Wi-Fi, MulteFire, other RATs related to 802.11 Institute of Electrical and Electronics Engineers (IEEE) standards, or other RATs.

The wireless communications system 200 may be configured to silence interference sources when communicating data between a base station 205 and a UE 210. In wireless communications system 200 there may be a trade-off between degrees of freedom (DoF) and link quality. Techniques are described herein that balance link quality with the efficient use of spectrum.

The wireless communications system 200 may include a base station 205 and a plurality of UEs 210 communicating with the base station 205. The base station 205 and the UEs 210 may communicate using both downlink transmissions 215 and uplink transmissions 220. The base station 205 may be an example of the base stations 105 described with reference to FIG. 1. The UEs 210 may be examples of the UEs 115 described with reference to FIG. 1.

In the wireless communications system 200, multiple users may be scheduled to communicate data during a single transmission opportunity. For example, the base station 205 may schedule a first UE 210—to use a first subset of resources of a transmission opportunity and a second UE 210-b to a use a second subset of resources of the transmission opportunity mutual exclusive of the first subset of resources. Such multi-user scheduling may occur in OFDM wireless communications systems.

In some shared RF spectrum band, to ensure link quality during a transmission, potential interference sources 225 may be silenced during a transmission of data. For example, the second UE 210-b (or other interference sources 225) may be silenced during the same transmission opportunity while the first UE 210-a communicate data with the base station 205. In some wireless communications systems, such silencing may be for an entire transmission opportunity. For example, in some Wi-Fi systems, an entire transmission opportunity for an entire channel may be reserved to communicate data between the first UE 210-a and the base station 205. In wireless communications systems where multiple users may use the same transmission opportunity, such a silencing procedure may cause some UEs to refrain from transmitting even though their communications would not interfere with the first UE 210-a communications. For example, if the first UE 210-a is scheduled to receive data using a first frequency subband of a transmission opportunity and the second UE 210-a is scheduled to receive data using a second frequency subband different from the first frequency subband of the transmission opportunity, the communications of the second UE 210-b may not need to be silenced. The communications of the second UE 210-b may not need to be silenced even when they are scheduled during the same transmission opportunity as the communications of the first UE 210-a. As such, some silencing procedures for shared bands may be lead to inefficient spectrum use in systems where multiple users may be scheduled during the same transmission opportunity.

As used herein, a transmission opportunity may refer to a time interval during which information may be communicated between different entities in a wireless communications network. The transmission opportunity may include a plurality of frequency resources and a plurality of time resources. For example, the transmission opportunity may include a plurality of frequency subbands to communicate data and a plurality of time subintervals to communicate data. In some cases, the resources of a single transmission opportunity may be allocated to different UEs. In some instances, a transmission opportunity may be an example of a frame, a subframe, or a slot.

Figure 3:
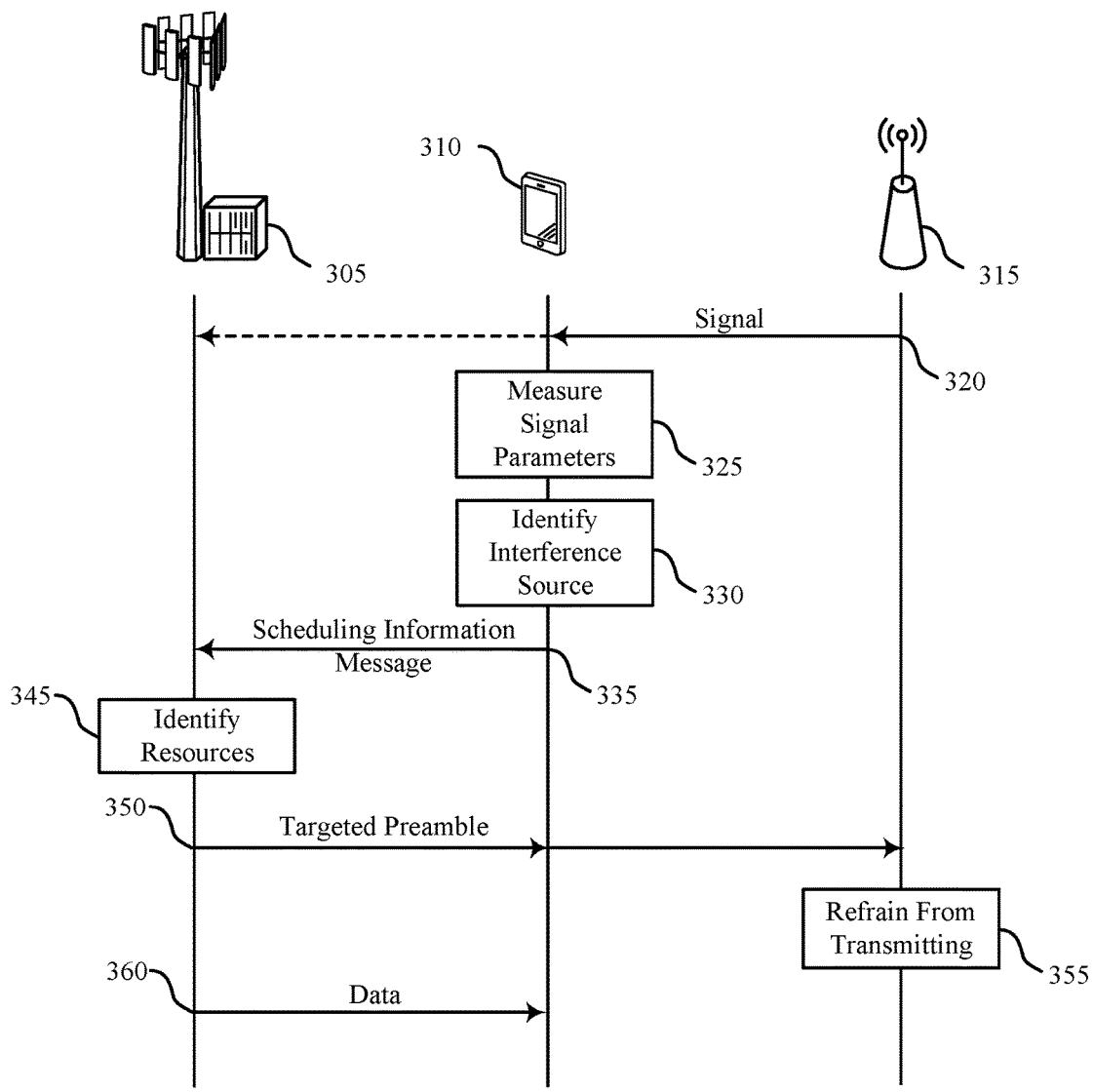
FIG. 3 illustrates an example of a communication scheme that supports channel reservation for multi-user scheduling in accordance with aspects of the present disclosure.

FIG. 3 illustrates an example of a communication scheme 300 that supports channel reservation for multi-user scheduling in accordance with various aspects of the present disclosure. In some examples, communication scheme 300 may implement aspects of wireless communications system 100. The communication scheme 300 may illustrate an example where a base station 305 targets and silences potential interference sources in a shared band. The base station 305 may be configured to protect the resources being used by an intended UE 310, while permitting other UEs (e.g., interference source 315) to transmit using other resources of the same transmission opportunity. In such embodiments, the UE 310 may not transmit any information or instructions that are used to silence potential interference sources 315.

The communication scheme 300 may illustrate communications between a base station 305, an intended UE 310, and an interference source 315. The base station 305 may be an example of base station 105, 205 described with reference to FIGS. 1 and 2. The intended UE 310 may refer to the UE scheduled to communicate data with the base station 305. Silencing procedures may be initiated to improve the link quality between the intended UE 310 and the base station 305. The intended UE 310 may be an example of the UEs 115, 210 described with reference to FIGS. 1 and 2. The interference source 315 may refer to any entity (base station, UE, or other entity) that may be capable of interfering with data communicated between the base station 305 and the intended UE 310. The interference source 315 may be an example of base stations 105, 205, UEs, 115, 210, interference source 225, or combinations thereof described with reference to FIGS. 1 and 2. While the communication scheme 300 illustrates a single interference source 315, the functions and procedures described herein may be applied to any number of interference sources.

In a shared band, a variety of entities may be sources of interference. For example, different UEs or base stations using the same RAT may be interference sources. Devices that use other RATs may cause interference in a shared band. For example, Wi-Fi devices may use the same RF spectrum band as MulteFire devices. In some cases, the base station 305 may be configured to identify, account for, and silence the potential interference sources to protect the link quality between the base station 305 and the intended UE 310. The base station 305 may acquire information through a variety of methods.

In some examples, the intended UE 310 may identify potential interference sources and communicate that information to the base station 305. An interference source 315 may transmit a signal 320 on a shared band. The signal 320 may be an example of any type of message, signal, or communicated data between the interference source 315 and any other recipient. The intended UE 310 may detect or receive the signal 320 as an unintended recipient. Because the UE 310 is an unintended recipient of the interference source's 315 signals 320, the signals 320 may interfere with some of the communications of UE 310.

At block 325, the UE 310 may measure signal parameters for a plurality of frequency bands of the shared band. The UE 310 may measure any number of different types of channel conditions. For example, the UE 310 may measure power parameters of frequency bands in the shared band, quality parameters, network congestion parameters, or combinations thereof. In some examples, the UE 310 may decode the signals 320 received to determine the identities of potential interference sources.

At block 330, based on the measured signal parameters, the UE 310 may identify potential interference sources. The UE 310 may compare the measured signal parameters to a threshold. If the signal parameter satisfies the threshold, the UE 310 may determine that interference is present and that an interference source is nearby.

In some examples, the UE 310 may maintain and store a repository of signal parameters. With such a repository, the UE 310 may be configured to identify patterns in interference over time. In some examples, the UE 310 may identify interference sources based on a duration, frequency, and strength of interfering signals coming from the same source. As such, intermittent or infrequent sources of signals 320 may not be identified as interference sources. In other examples, however, the UE 310 may identify any source of a signal 320 as an interference source.

The UE 310 may transmit a scheduling information message 335 to the base station 305. The scheduling information message 335 may be the way by which the UE 310 communicates interference information with base station 305. The scheduling information message 335 may include the measured signal parameters. In some examples, the scheduling information message 335 may include identifiers of specific interference sources 315 identified by the UE 310. The scheduling information message 335 may be transmitted periodically based on a schedule. In some examples, the scheduling information message 335 may be transmitted based on a request from the base station 305. In some examples, the scheduling information message 335 may be an example of resource response message.

In some examples, the base station 305 may perform the functions described with reference to blocks 325 and 330. In such examples, the signal 320 may be received by the base station 305. In yet other examples, the UE 310 may measure signal parameters, but may identify interference sources. Instead, the UE 310 may transmit the measured signal parameters to the base station 305 to perform post-measurement processing, such as maintaining lists and repositories, and identifying specific interference sources.

At block 345, the base station 305 may identify resources to communicate data with the UE 310. The base station 305 may first determine that data is waiting to be transmitted to the UE 310. The base station 305 may identify a subset of resources of a transmission opportunity to use to transmit data to the UE 310. For example, the base station 305 may identify specific frequency subbands and/or specific time subintervals of the transmission opportunity to use to transmit data to the UE 310. In some examples, the subset of resources used to transmit data may be less than a set of all resources of the transmission opportunity. Other UEs may be scheduled by the base station 305 to use the other resources of the transmission opportunity. In such a manner, the transmission opportunity supports multiple users.

The base station 305 may broadcast a targeted preamble 350 that includes an indication of the identified resources to be used for communication with the UE 310. The targeted preamble 350 may be a message configured to communicate an impending data transmission to the UE 310. The targeted preamble 350 may indicate the intended UE 310 that is to be communicated with. The targeted preamble 350 may be broadcast using resources that are different than the protected resources. In such examples, the targeted preamble 350 may be communicated using control channels or other channels and may communicate information about other channels and frequency subbands.

The targeted preamble 350 may indicate the resources being used to communicate data between the base station 305 and the UE 310. The targeted preamble 350 may specify which resources are scheduled for the UE 310 with more specificity than other silencing procedures. For example, the targeted preamble 350 may indicate specific frequency subbands and/or specific time subintervals of a transmission opportunity to be used to communicate data between the UE 310 and the base station 305. In this manner, other UEs that are scheduled to use other resources of the transmission opportunity may continue to communicate using those other resources, rather than being silenced.

The targeted preamble 350 may also include instructions to cause one or more identified interference sources to be silent during the transmission resources indicated by the targeted preamble 350. The targeted preamble 350 may also include identifiers for specific interference sources. As such, the targeted preamble 350 may be received by a wide variety of potential interference sources. Once a potential interference source 315 receives the targeted preamble 350, the potential interference source 315 may determine whether scheduled resources overlap with the protected resources included in the targeted preamble 350. If the protected resources overlap with scheduled resources, the potential interference source 315 may refrain from communicating data using the resources indicated by the targeted preamble 350.

In other examples, the potential interference source 315 may be specified by the targeted preamble 350. As such, when the potential interference source 315 receives a targeted preamble that specifically indicates the entity as an interference source, the potential interference source 315 may refrain from communicating during the resources indicated by the targeted preamble 350. In some examples, the targeted preamble 350 may be addressed to specific interference sources, rather than merely broadcasted out indiscriminately.

To generate a targeted preamble 350, the base station 305 may identify the UE 310 with which the base station 305 desires to communicate. The base station 305 may identify measured signal parameters associated with the UE 310. The base station 305 may identify potential interferences sources 315. In some examples, the base station 305 may compare the measured signal parameters to the resources scheduled to be used to communicate with UE 310. If the scheduled resources overlap with resources that are likely to have other signals being communicated on them, the base station 305 may determine that one or more interference sources should be silenced to improve the link quality with the UE 310. In some examples, the base station 305 may identify all potential interference sources indicated by the measured signal parameters. In these examples, the base station 305 that every potential interference source should be silent during the resources identified by the targeted preamble 350.

Upon receiving the targeted preamble 350, the UE 310 may determine whether the targeted resources are intended to be used with the UE 310 or some other network entity. If the resources are intended to be used in conjunction with the UE 310, the UE 310 may identify the resources indicated by the targeted preamble 350. Depending on the type of communication, the UE 310 may prepare to receive data or to transmit data. In some examples, the UE 310 does not transmit a response message or a clear-to-send message. Instead, the UE 310 may rely on the targeted preamble 350 to silence potential interference sources.

At block 355, upon receiving the targeted preamble 350, the interference source 315 may determine whether the targeted resources are intended to be used with the interference source 315 or some other network entity. If the resources are intended to be used with some other network entity, the interference source 315 may identify the resources indicated by the targeted preamble 350. In some examples, the interference source 315 may compare its scheduled resources to the identified resources of the targeted preamble 350. If the scheduled resources overlap with the identified resources, the interference source 315 may refrain from communicating during the identified resources based on receiving the targeted preamble 350. In some examples, the interference source 315 may determine whether the targeted preamble 350 indicates the interference source 315 specifically as an entity that should be silenced during the identified resources. If the interference source 315 is included in a list of jammers found in the targeted preamble 350, the interference source 315 may refrain from transmitting. The interference source 315 may also identify silencing instructions included in the targeted preamble 350. In some examples, the interference source 315 may transmit an ACK/NACK message about receiving the targeted preamble 350.

The base station 305 may communicate data 360 with the UE 310 using the identified resources. For example, the base station 305 may transmit data 360 to the UE 310. In addition, other entities may also communicate data using the same transmission opportunity as the UE 310 based on the targeted preamble 350 indicating specifically which resources to be protected for communicating with the UE 310.

Figure 4:
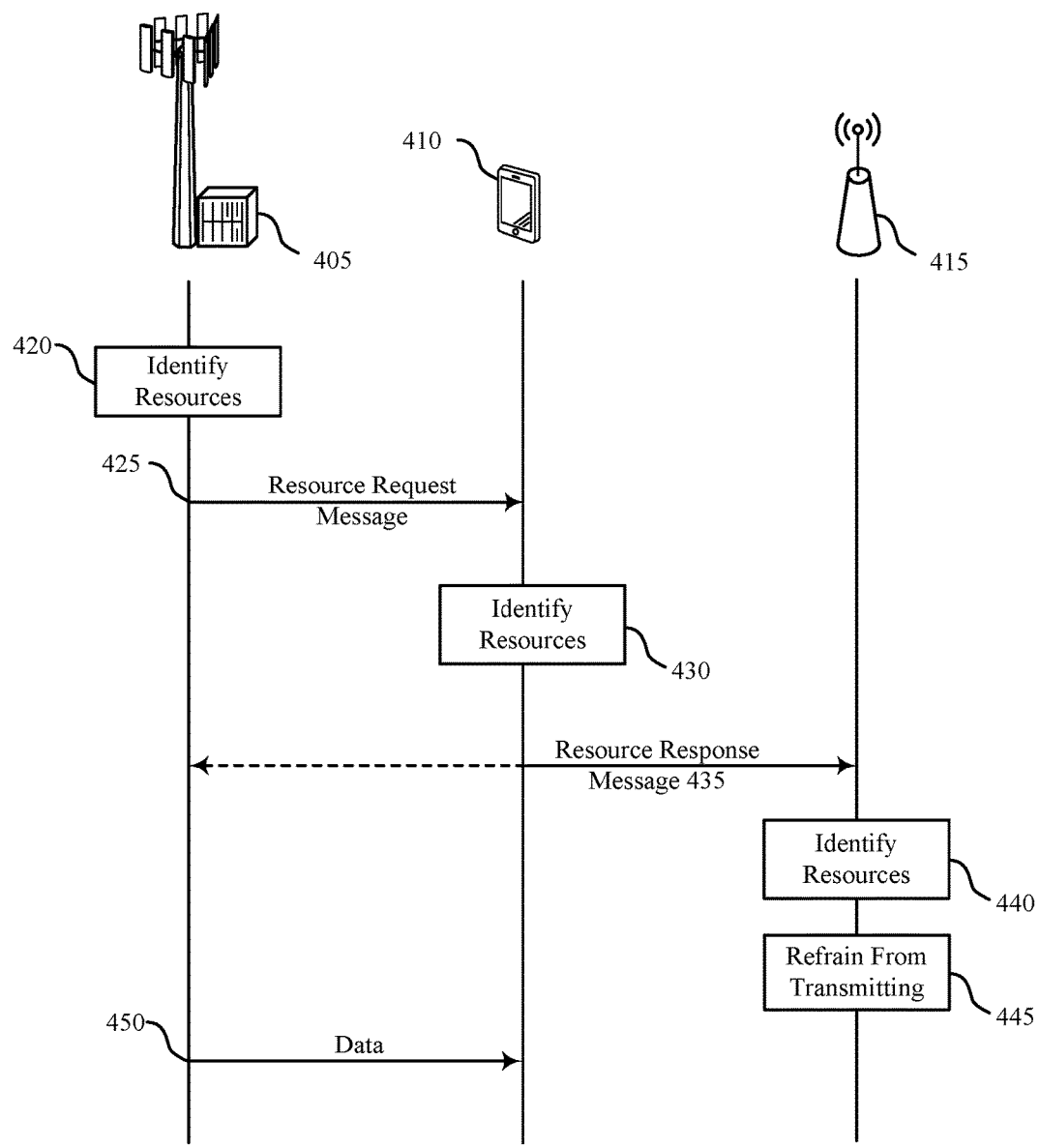
FIG. 4 illustrates an example of a communication scheme that supports channel reservation for multi-user scheduling in accordance with aspects of the present disclosure.

FIG. 4 illustrates an example of a communication scheme 400 that supports channel reservation for multi-user scheduling in accordance with various aspects of the present disclosure. In some examples, communication scheme 400 may implement aspects of wireless communications system 100. The communication scheme 400 may illustrate an example where a UE 410 targets and silences potential interference sources in a shared band. The UE 410 may be configured to protect the resources being used to communicate data between a base station 405 and the intended UE 410, while permitting other UEs (e.g., interference source 415) to transmit using other resources of the same transmission opportunity.

The communication scheme 400 may illustrate communications between a base station 405, an intended UE 410, and an interference source 415. The base station 405 may be an example of base station 105, 205, 305 described with reference to FIGS. 1-3. The intended UE 410 may refer to the UE scheduled to communicate data with the base station 405. Silencing procedures may be initiated to improve the link quality between the intended UE 410 and the base station 405. The intended UE 410 may be an example of the UEs 115, 210, 310 described with reference to FIGS. 1-3. The interference source 415 may refer to any entity (base station, UE, or other entity) that may be capable of interfering with data communicated between the base station 405 and the intended UE 410. The interference source 415 may be an example of base stations 105, 205, 305, UEs, 115, 210, 310, interference source 225, 315 or combinations thereof described with reference to FIGS. 1-3. While the communication scheme 400 illustrates a single interference source 415, the functions and procedures described herein may be applied to any number of interference sources.

At block 420, the base station 405 may identify resources to communicate data with the UE 410. The base station 405 may first determine that data is waiting to be transmitted to the UE 410. The base station 405 may identify a subset of resources of a transmission opportunity to use to transmit data to the UE 410. For example, the base station 405 may identify specific frequency subbands and/or specific time subintervals of the transmission opportunity to use to transmit data to the UE 410. In some examples, the subset of resources used to transmit data may be less than a set of all resources of the transmission opportunity. Other UEs may be scheduled by the base station 405 to use the other resources of the transmission opportunity. In such a manner, the transmission opportunity supports multiple users.

The base station 405 may transmit a resource request message 425 that includes an indication of the identified resources to be used for communication with the UE 410. The resource request message 425 may be a message configured to inform the UE 410 that the base station 405 is ready to transmit data to the UE 410. The resource request message 425 may include resource information indicating which resources the base station 405 has scheduled to transmit the data to the UE 410. The resource request message 425 may include an identifier reference the UE 410. The resource request message 425 may be transmitted using resources that are different than the protected resources indicated by the resource request message 425. In such examples, the resource request message 425 may be communicated using control channels or other channels and may communicate information about other channels and frequency subbands.

The resource request message 425 may indicate a subset of resources of a transmission opportunity to be used to transmit data to the UE 410. The subset of resources may indicate a subset of frequency resources and/or a subset of time resources of the transmission opportunity. By including specific information about the resources that are scheduled to transmit data to the UE 410, the resource request message 425 may enable other entities to communicate using other resources of the transmission opportunity. In this manner, some entities that may have otherwise been silenced in the shared band may continue to communicate.

At block 430, upon receiving the resource request message 425, the UE 410 identify the resources included in the resource request message 425. The UE 410 may determine whether it can receive the data from the base station 405 based on the identified resources. As part of determining whether it can receive data, the UE 410 may transmit instructions silencing potential interference sources. As part of this, the UE 410 may identify potential interference sources 415, in some examples.

The UE 410 broadcast a resource response message 435 based on the response request message. The resource response message 435 may be a message configured to inform the potential interference sources 415 (e.g., other UEs and base stations) about the upcoming transmission of data from the base station 405 to the UE 410. In some examples, the resources response message 435 may also be configured to inform the base station 405 that the UE 410 is ready to receive the data. The resource response message 435 may include instructions to the potential interference sources to refrain from communicating during the resources indicated in the resource response message 435. In some examples, the resource response message 435 may include identifiers indicating the interference sources 415.

The resource response message 435 may include the resources indicated in the resource request message 425. The resources indicated in the resource response message may indicate a subset of resources of a transmission opportunity that are scheduled to communicate data between the base station 405 and the UE 410. The resource response message 435 may include instructions that receiving entities are to refrain from communicating using the indicated resources. In some examples, the resource response message 435 may indicate specifically which network entities (e.g., identified interference sources) are to refrain from communicating during the identified resources. In some examples, the resource response message 435 may inform the base station 405 that it can transmit the data using the identified resources. In some examples, the resource response message 435 may be an example of a selective channel reservation message. The resource response message 435 may indicate resources with more specificity than other similar silencing procedures. For example, the resource response message 435 may indicate frequency subbands in a transmission opportunity, where other silencing methods only indicate time resources.

At block 440, upon receiving the resource response message 435, an interference source 415 may determine whether it needs to refrain from communicating. The interference source 415 may identify the resources indicated in the resource response message 435. In some examples, the interference source 415 may compare its own scheduled resources to the identified resources in the resource response message 435. If the scheduled resources overlap with the identified resources, the interference source 415 may refrain from communicating using the identified resources, at block 445. If the interference source 415 determines that it has scheduled resources in the transmission opportunity that do not overlap with the identified resources. the interference source 415 may continue to communicate using those non-overlapping scheduled resources. In some examples, the interference source 415 may determine whether the resource response message 435 indicates the interference source 415 specifically as an entity that should be silenced during the identified resources. If the interference source 415 is included in a list of jammers found in the resource response message 435, the interference source 415 may refrain from transmitting, as in at block 445. The interference source 415 may also identify silencing instructions included in the resource response message 435.

The base station 405 may communicate data 450 with the UE 410 using the identified resources. For example, the base station 405 may transmit data 450 to the UE 410. In addition, other entities may also communicate data using the same transmission opportunity as the UE 410 based on the resource response message 435 indicating specifically which resources to be protected for communicating with the UE 410.

Figure 5:
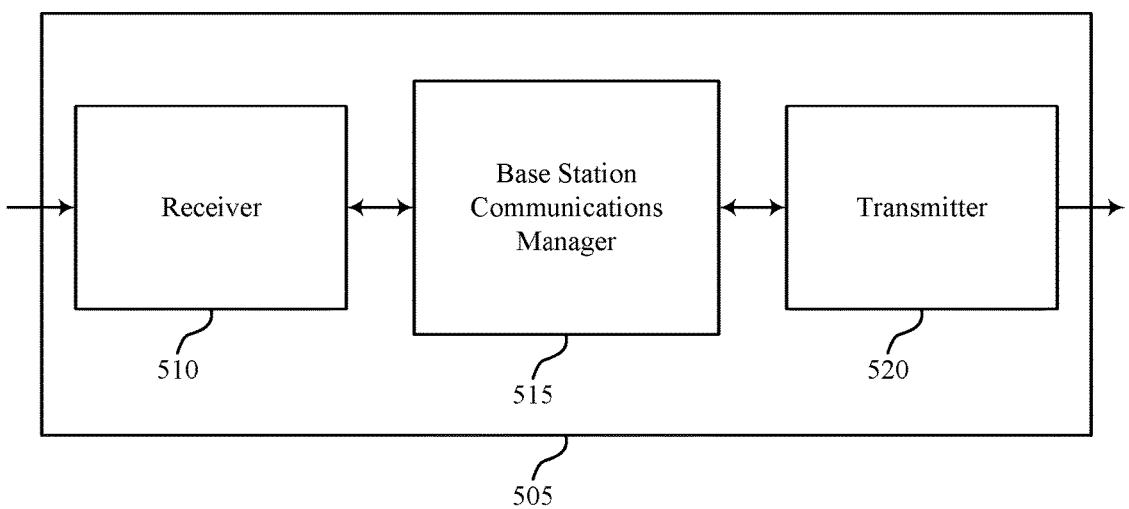
FIGS. 5 through 7 show block diagrams of a device that supports channel reservation for multi-user scheduling in accordance with aspects of the present disclosure.

FIG. 5 shows a block diagram 500 of a wireless device 505 that supports channel reservation for multi-user scheduling in accordance with aspects of the present disclosure. Wireless device 505 may be an example of aspects of a base station 105 as described herein. Wireless device 505 may include receiver 510, base station communications manager 515, and transmitter 520. Wireless device 505 may also include a processor. Each of these components may be in communication with one another (e.g., via one or more buses).

Receiver 510 may receive information such as packets, user data, or control information associated with various information channels (e.g., control channels, data channels, and information related to channel reservation for multi-user scheduling, etc.). Information may be passed on to other components of the device. The receiver 510 may be an example of aspects of the transceiver 835 described with reference to FIG. 8. The receiver 510 may utilize a single antenna or a set of antennas.

Base station communications manager 515 may be an example of aspects of the base station communications manager 815 described with reference to FIG. 8. Base station communications manager 515 and/or at least some of its various sub-components may be implemented in hardware, software executed by a processor, firmware, or any combination thereof. If implemented in software executed by a processor, the functions of the base station communications manager 515 and/or at least some of its various sub-components may be executed by a general-purpose processor, a digital signal processor (DSP), an application-specific integrated circuit (ASIC), an field-programmable gate array (FPGA) or other programmable logic device, discrete gate or transistor logic, discrete hardware components, or any combination thereof designed to perform the functions described in the present disclosure. The base station communications manager 515 and/or at least some of its various sub-components may be physically located at various positions, including being distributed such that portions of functions are implemented at different physical locations by one or more physical devices. In some examples, base station communications manager 515 and/or at least some of its various sub-components may be a separate and distinct component in accordance with various aspects of the present disclosure. In other examples, base station communications manager 515 and/or at least some of its various sub-components may be combined with one or more other hardware components, including but not limited to an I/O component, a transceiver, a network server, another computing device, one or more other components described in the present disclosure, or a combination thereof in accordance with various aspects of the present disclosure.

Base station communications manager 515 may identify resources of a shared radio frequency spectrum band to use to transmit data to a UE, identify an interference source based on the identified resources, and broadcast, via the shared radio frequency spectrum band, a targeted preamble including an instruction configured to silence the interference source during a transmission of the data to the UE using the identified resources, the instruction including an indication of the interference source and the identified resources.

Transmitter 520 may transmit signals generated by other components of the device. In some examples, the transmitter 520 may be collocated with a receiver 510 in a transceiver module. For example, the transmitter 520 may be an example of aspects of the transceiver 835 described with reference to FIG. 8. The transmitter 520 may utilize a single antenna or a set of antennas.

Figure 6:
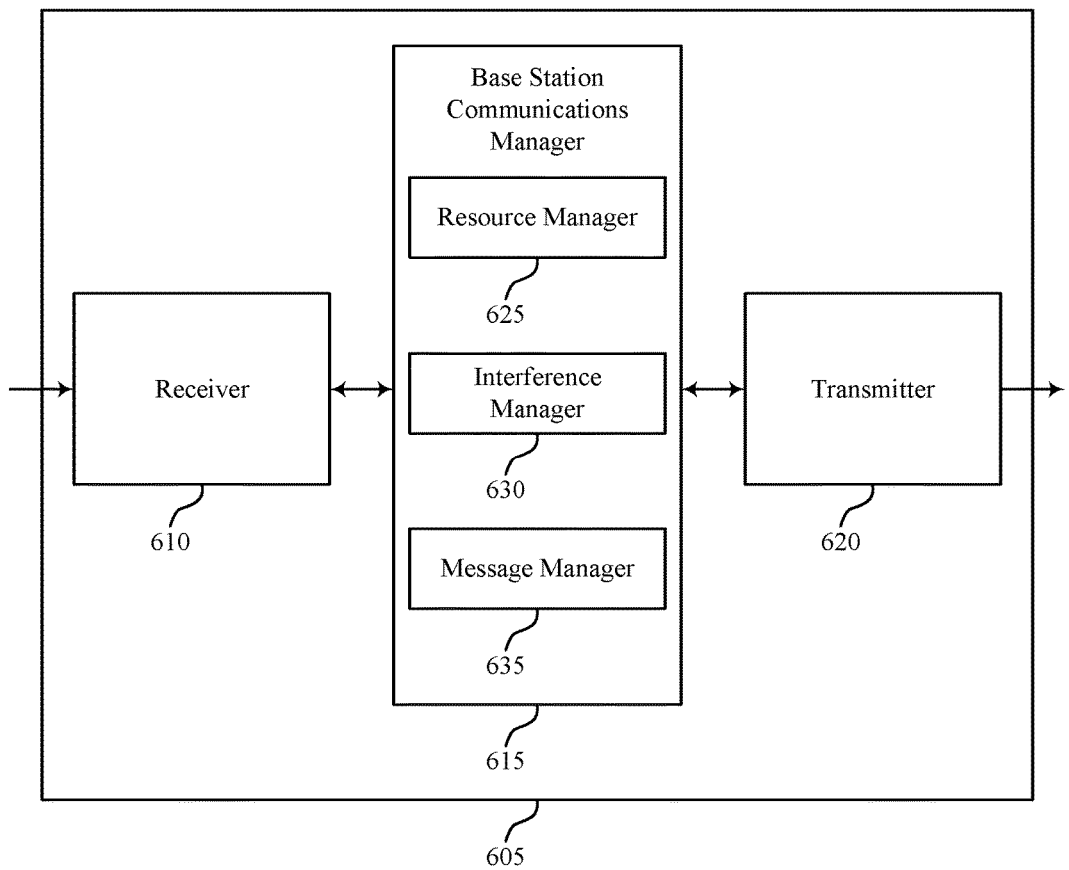

FIG. 6 shows a block diagram 600 of a wireless device 605 that supports channel reservation for multi-user scheduling in accordance with aspects of the present disclosure. Wireless device 605 may be an example of aspects of a wireless device 505 or a base station 105 as described with reference to FIG. 5. Wireless device 605 may include receiver 610, base station communications manager 615, and transmitter 620. Wireless device 605 may also include a processor. Each of these components may be in communication with one another (e.g., via one or more buses).

Receiver 610 may receive information such as packets, user data, or control information associated with various information channels (e.g., control channels, data channels, and information related to channel reservation for multi-user scheduling, etc.). Information may be passed on to other components of the device. The receiver 610 may be an example of aspects of the transceiver 835 described with reference to FIG. 8. The receiver 610 may utilize a single antenna or a set of antennas.

Base station communications manager 615 may be an example of aspects of the base station communications manager 815 described with reference to FIG. 8. Base station communications manager 615 may also include resource manager 625, interference manager 630, and message manager 635.

Resource manager 625 may identify resources of a shared radio frequency spectrum band to use to transmit data to a UE. In some cases, identifying the resources further includes: selecting a subset of resources associated with a transmission opportunity, where the subset of resources is less than a set of all resources associated with the transmission opportunity. In some cases, identifying the resources further includes: selecting a subset of frequency resources associated with a transmission opportunity, where the subset of frequency resources is less than a set of all frequency resources associated with the transmission opportunity.

Interference manager 630 may identify an interference source based on the identified resources and select a respective signal parameter from the set of signal parameters measured by the UE that corresponds to the identified resources, where identifying the interference source is based on the respective signal parameter measured by the UE.

Message manager 635 may broadcast, via the shared radio frequency spectrum band, a targeted preamble including an instruction configured to silence the interference source during a transmission of the data to the UE using the identified resources, the instruction including an indication of the interference source and the identified resources, another UE is scheduled to use at least a portion of resources associated with a transmission opportunity, where the portion of resources are different from the resources of the transmission opportunity used by the UE to receive data, and transmit the data to the UE using the identified resources. In some cases, the identified resources included in the targeted preamble indicate a subset of frequency resources different from frequency resources used to broadcast the targeted preamble.

Transmitter 620 may transmit signals generated by other components of the device. In some examples, the transmitter 620 may be collocated with a receiver 610 in a transceiver module. For example, the transmitter 620 may be an example of aspects of the transceiver 835 described with reference to FIG. 8. The transmitter 620 may utilize a single antenna or a set of antennas.

Figure 7:
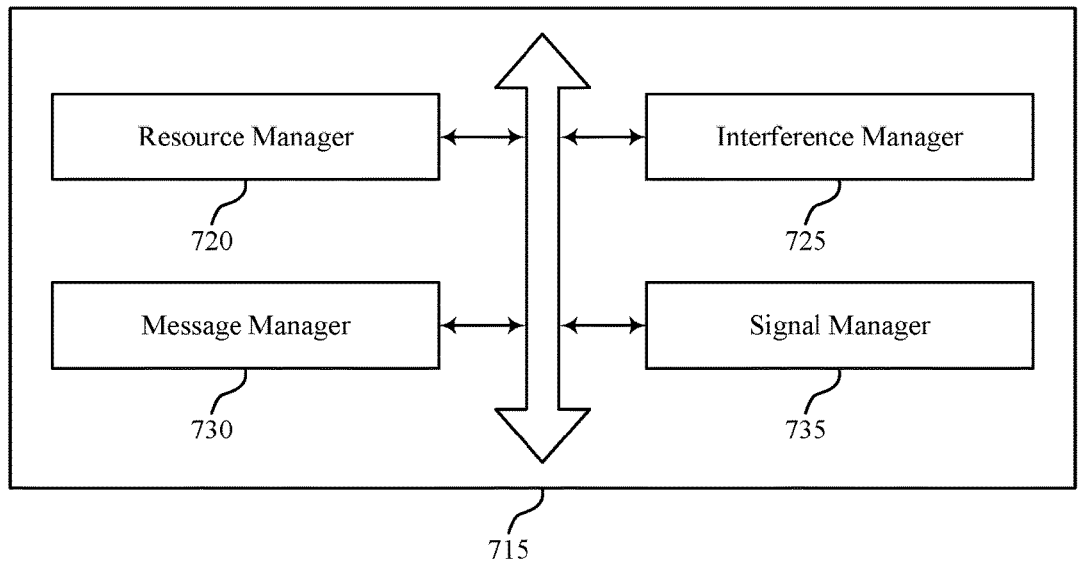

FIG. 7 shows a block diagram 700 of a base station communications manager 715 that supports channel reservation for multi-user scheduling in accordance with aspects of the present disclosure. The base station communications manager 715 may be an example of aspects of a base station communications manager 515, a base station communications manager 615, or a base station communications manager 815 described with reference to FIGS. 5, 6, and 8. The base station communications manager 715 may include resource manager 720, interference manager 725, message manager 730, and signal manager 735. Each of these modules may communicate, directly or indirectly, with one another (e.g., via one or more buses).

Resource manager 720 may identify resources of a shared radio frequency spectrum band to use to transmit data to a UE. In some cases, identifying the resources further includes: selecting a subset of resources associated with a transmission opportunity, where the subset of resources is less than a set of all resources associated with the transmission opportunity. In some cases, identifying the resources further includes: selecting a subset of frequency resources associated with a transmission opportunity, where the subset of frequency resources is less than a set of all frequency resources associated with the transmission opportunity.

Interference manager 725 may identify an interference source based on the identified resources and select a respective signal parameter from the set of signal parameters measured by the UE that corresponds to the identified resources, where identifying the interference source is based on the respective signal parameter measured by the UE.

Message manager 730 may broadcast, via the shared radio frequency spectrum band, a targeted preamble including an instruction configured to silence the interference source during a transmission of the data to the UE using the identified resources, the instruction including an indication of the interference source and the identified resources, another UE is scheduled to use at least a portion of resources associated with a transmission opportunity, where the portion of resources are different from the resources of the transmission opportunity used by the UE to receive data, and transmit the data to the UE using the identified resources. In some cases, the identified resources included in the targeted preamble indicate a subset of frequency resources different from frequency resources used to broadcast the targeted preamble.

Signal manager 735 may receive a quality message from the UE that includes a set of signal parameters for a set of frequency subbands measured by the UE.

Figure 8:
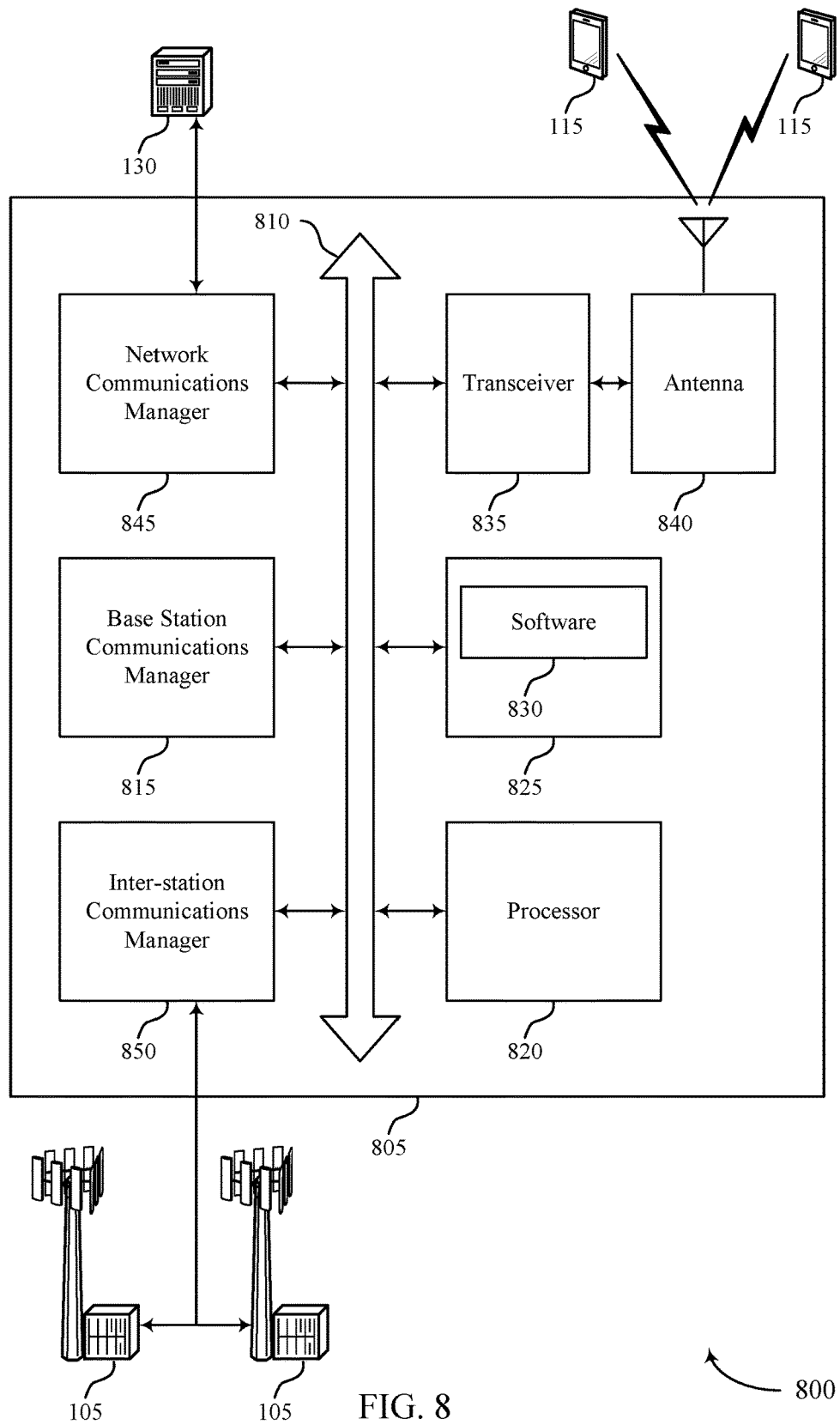
FIG. 8 illustrates a block diagram of a system including a base station that supports channel reservation for multi-user scheduling in accordance with aspects of the present disclosure.

FIG. 8 shows a diagram of a system 800 including a device 805 that supports channel reservation for multi-user scheduling in accordance with aspects of the present disclosure. Device 805 may be an example of or include the components of wireless device 505, wireless device 605, or a base station 105 as described above, e.g., with reference to FIGS. 5 and 6. Device 805 may include components for bi-directional voice and data communications including components for transmitting and receiving communications, including base station communications manager 815, processor 820, memory 825, software 830, transceiver 835, antenna 840, network communications manager 845, and inter-station communications manager 850. These components may be in electronic communication via one or more busses (e.g., bus 810). Device 805 may communicate wirelessly with one or more UEs 115.

Processor 820 may include an intelligent hardware device, (e.g., a general-purpose processor, a DSP, a central processing unit (CPU), a microcontroller, an ASIC, an FPGA, a programmable logic device, a discrete gate or transistor logic component, a discrete hardware component, or any combination thereof). In some cases, processor 820 may be configured to operate a memory array using a memory controller. In other cases, a memory controller may be integrated into processor 820. Processor 820 may be configured to execute computer-readable instructions stored in a memory to perform various functions (e.g., functions or tasks supporting channel reservation for multi-user scheduling).

Memory 825 may include random access memory (RAM) and read only memory (ROM). The memory 825 may store computer-readable, computer-executable software 830 including instructions that, when executed, cause the processor to perform various functions described herein. In some cases, the memory 825 may contain, among other things, a basic input/output system (BIOS) which may control basic hardware and/or software operation such as the interaction with peripheral components or devices.

Software 830 may include code to implement aspects of the present disclosure, including code to support channel reservation for multi-user scheduling. Software 830 may be stored in a non-transitory computer-readable medium such as system memory or other memory. In some cases, the software 830 may not be directly executable by the processor but may cause a computer (e.g., when compiled and executed) to perform functions described herein.

Transceiver 835 may communicate bi-directionally, via one or more antennas, wired, or wireless links as described above. For example, the transceiver 835 may represent a wireless transceiver and may communicate bi-directionally with another wireless transceiver. The transceiver 835 may also include a modem to modulate the packets and provide the modulated packets to the antennas for transmission, and to demodulate packets received from the antennas.

In some cases, the wireless device may include a single antenna 840. However, in some cases the device may have more than one antenna 840, which may be capable of concurrently transmitting or receiving multiple wireless transmissions.

Network communications manager 845 may manage communications with the core network (e.g., via one or more wired backhaul links). For example, the network communications manager 845 may manage the transfer of data communications for client devices, such as one or more UEs 115.

Inter-station communications manager 850 may manage communications with other base station 105, and may include a controller or scheduler for controlling communications with UEs 115 in cooperation with other base stations 105. For example, the inter-station communications manager 850 may coordinate scheduling for transmissions to UEs 115 for various interference mitigation techniques such as beamforming or joint transmission. In some examples, inter-station communications manager 850 may provide an X2 interface within an Long Term Evolution (LTE)/LTE-A wireless communication network technology to provide communication between base stations 105.

Figure 9:
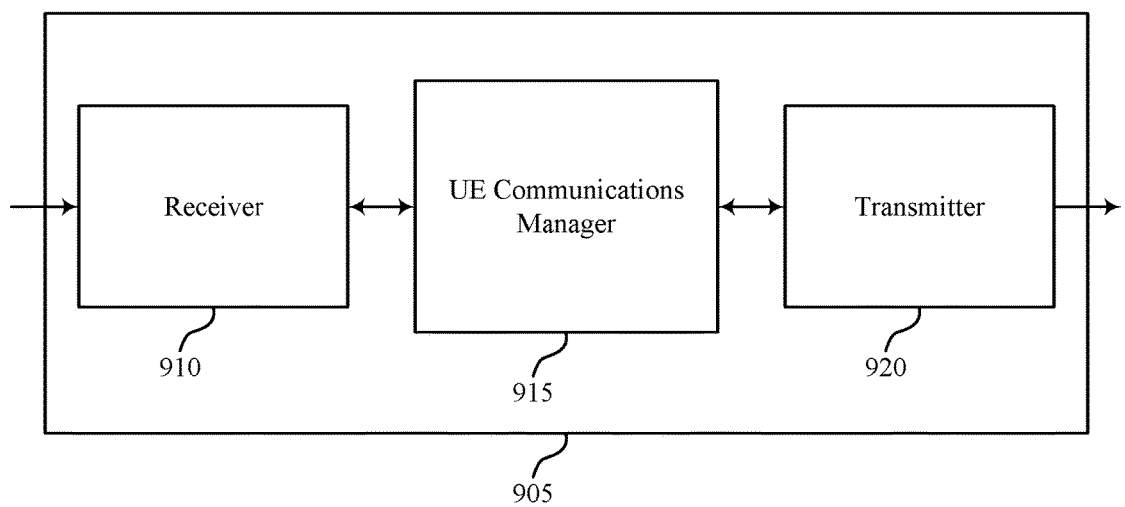
FIGS. 9 through 11 show block diagrams of a device that supports channel reservation for multi-user scheduling in accordance with aspects of the present disclosure.

FIG. 9 shows a block diagram 900 of a wireless device 905 that supports channel reservation for multi-user scheduling in accordance with aspects of the present disclosure. Wireless device 905 may be an example of aspects of a UE 115 as described herein. Wireless device 905 may include receiver 910, UE communications manager 915, and transmitter 920. Wireless device 905 may also include a processor. Each of these components may be in communication with one another (e.g., via one or more buses).

Receiver 910 may receive information such as packets, user data, or control information associated with various information channels (e.g., control channels, data channels, and information related to channel reservation for multi-user scheduling, etc.). Information may be passed on to other components of the device. The receiver 910 may be an example of aspects of the transceiver 1235 described with reference to FIG. 12. The receiver 910 may utilize a single antenna or a set of antennas.

UE communications manager 915 may be an example of aspects of the UE communications manager 1215 described with reference to FIG. 12. UE communications manager 915 and/or at least some of its various sub-components may be implemented in hardware, software executed by a processor, firmware, or any combination thereof. If implemented in software executed by a processor, the functions of the UE communications manager 915 and/or at least some of its various sub-components may be executed by a general-purpose processor, a DSP, an ASIC, an FPGA or other programmable logic device, discrete gate or transistor logic, discrete hardware components, or any combination thereof designed to perform the functions described in the present disclosure. The UE communications manager 915 and/or at least some of its various sub-components may be physically located at various positions, including being distributed such that portions of functions are implemented at different physical locations by one or more physical devices. In some examples, UE communications manager 915 and/or at least some of its various sub-components may be a separate and distinct component in accordance with various aspects of the present disclosure. In other examples, UE communications manager 915 and/or at least some of its various sub-components may be combined with one or more other hardware components, including but not limited to an I/O component, a transceiver, a network server, another computing device, one or more other components described in the present disclosure, or a combination thereof in accordance with various aspects of the present disclosure.

UE communications manager 915 may measure, by a UE, a set of signal parameters for a set of frequency subbands in a shared radio frequency spectrum band received by the UE, transmit a quality message that includes the set of signal parameters measured by the UE, and receive, via the shared radio frequency spectrum band, a targeted preamble that indicates resources to be used by the UE to communicate data, where the targeted preamble includes an instruction configured to silence an interference source during a transmission of data to the UE using the resources, the instruction including an indication of the interference source and the identified resources. The UE communications manager 915 may also receive a resource request message from a base station, identify a subset of resources of a transmission opportunity included in the resource request message to be used for receiving data from the base station, and broadcast a resource response message to a potential interference source indicating the subset of resources to be used for receiving data from the base station. The UE communications manager 915 may also receive, by a network entity, a resource response message from a UE, identify a subset of frequency resources of a transmission opportunity included in the resource response message to be used by the UE to communicate data, where the subset of frequency resources is less than a set of all resources associated with the transmission opportunity, and refrain from transmitting data using the subset of frequency resources included in the resource response message.

Transmitter 920 may transmit signals generated by other components of the device. In some examples, the transmitter 920 may be collocated with a receiver 910 in a transceiver module. For example, the transmitter 920 may be an example of aspects of the transceiver 1235 described with reference to FIG. 12. The transmitter 920 may utilize a single antenna or a set of antennas.

Figure 10:
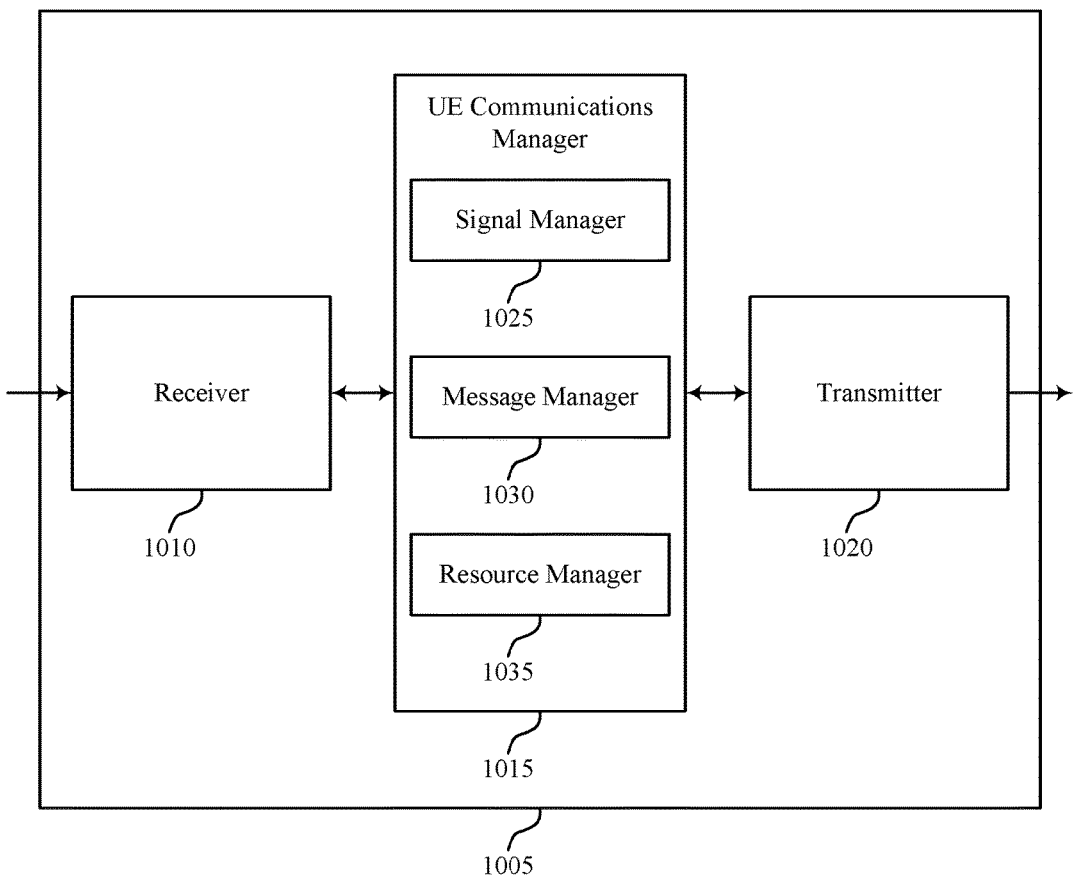

FIG. 10 shows a block diagram 1000 of a wireless device 1005 that supports channel reservation for multi-user scheduling in accordance with aspects of the present disclosure. Wireless device 1005 may be an example of aspects of a wireless device 905 or a UE 115 as described with reference to FIG. 9. Wireless device 1005 may include receiver 1010, UE communications manager 1015, and transmitter 1020. Wireless device 1005 may also include a processor. Each of these components may be in communication with one another (e.g., via one or more buses).

Receiver 1010 may receive information such as packets, user data, or control information associated with various information channels (e.g., control channels, data channels, and information related to channel reservation for multi-user scheduling, etc.). Information may be passed on to other components of the device. The receiver 1010 may be an example of aspects of the transceiver 1235 described with reference to FIG. 12. The receiver 1010 may utilize a single antenna or a set of antennas.

UE communications manager 1015 may be an example of aspects of the UE communications manager 1215 described with reference to FIG. 12. UE communications manager 1015 may also include signal manager 1025, message manager 1030, and resource manager 1035.

Signal manager 1025 may measure, by a UE, a set of signal parameters for a set of frequency subbands in a shared radio frequency spectrum band received by the UE and transmit a quality message that includes the set of signal parameters measured by the UE. In some cases, the quality message is a resource response message.

Message manager 1030 may receive, via the shared radio frequency spectrum band, a targeted preamble that indicates resources to be used by the UE to communicate data, where the targeted preamble includes an instruction configured to silence an interference source during a transmission of data to the UE using the resources, the instruction including an indication of the interference source and the identified resources, another UE is scheduled to use at least a portion of resources associated with a transmission opportunity, where the portion of resources are different from the resources of the transmission opportunity used by the UE to receive data, receive a resource request message from a base station, broadcast a resource response message to a potential interference source indicating the subset of resources to be used for receiving data from the base station, transmit the data using the identified resources, receive data from the base station using the subset of resources, another UE is scheduled to use at least a portion of resources associated with the transmission opportunity, where the portion of resources are different from the resources of the transmission opportunity used by the UE to receive data, receive, by a network entity, a resource response message from a UE, and refrain from transmitting data using the subset of frequency resources included in the resource response message. In some cases, the network entity is scheduled to use at least a portion of frequency resources associated with the transmission opportunity, where the portion of frequency resources are different from the resources of the transmission opportunity used by the UE to receive data. In some cases, the resource response message includes a subset of frequency resources of the transmission opportunity for communication with the base station.

Resource manager 1035 may identify the interference source associated with the UE based on the set of signal parameters, identify a subset of resources of a transmission opportunity included in the resource request message to be used for receiving data from the base station, identify a subset of frequency resources of a transmission opportunity included in the resource response message to be used by the UE to communicate data, where the subset of frequency resources is less than a set of all resources associated with the transmission opportunity, compare the subset of frequency resources to a scheduled resources to be used by the network entity to communicate data, where refraining from transmitting data is based on the subset of frequency resources overlapping with the scheduled resources, and determine a bitmap value from information included in the resource response message, where identifying the subset of frequency resources is based on the bitmap value. In some cases, the resources include a subset of resources that is less than a set of all resources associated with a transmission opportunity. In some cases, the resources include a subset of frequency resources that is less than a set of all frequency resources associated with a transmission opportunity. In some cases, the subset of resources is less than a set of all resources associated with the transmission opportunity. In some cases, the subset of resources included in the resource response message indicate a subset of frequency resources different from frequency resources used to broadcast the resource response message.

Transmitter 1020 may transmit signals generated by other components of the device. In some examples, the transmitter 1020 may be collocated with a receiver 1010 in a transceiver module. For example, the transmitter 1020 may be an example of aspects of the transceiver 1235 described with reference to FIG. 12. The transmitter 1020 may utilize a single antenna or a set of antennas.

Figure 11:
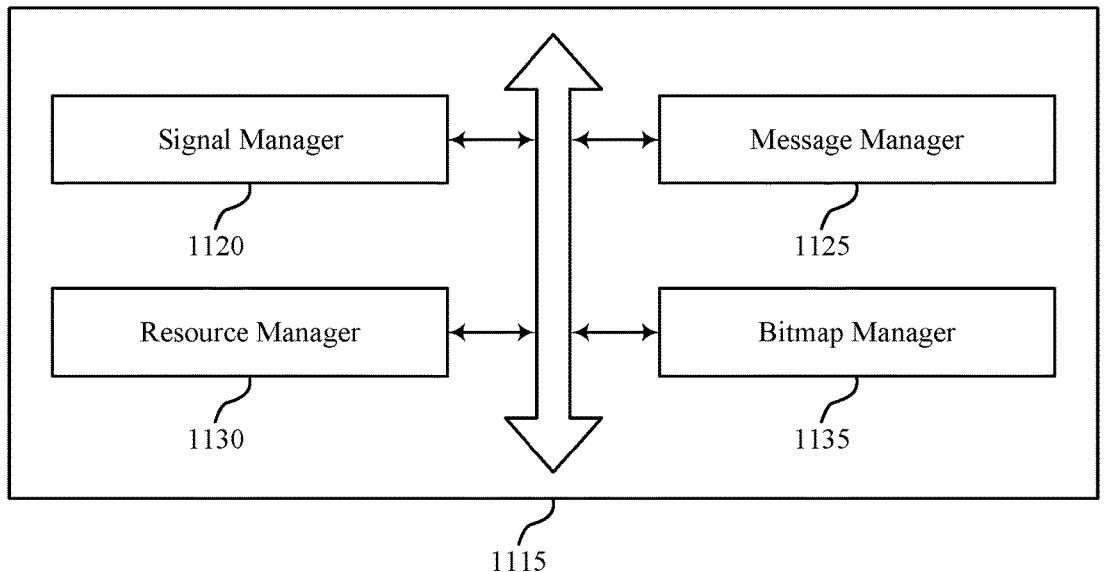
Figure 11:
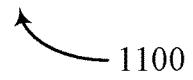

FIG. 11 shows a block diagram 1100 of a UE communications manager 1115 that supports channel reservation for multi-user scheduling in accordance with aspects of the present disclosure. The UE communications manager 1115 may be an example of aspects of a UE communications manager 1215 described with reference to FIGS. 9, 10, and 12. The UE communications manager 1115 may include signal manager 1120, message manager 1125, resource manager 1130, and bitmap manager 1135. Each of these modules may communicate, directly or indirectly, with one another (e.g., via one or more buses).

Signal manager 1120 may measure, by a UE, a set of signal parameters for a set of frequency subbands in a shared radio frequency spectrum band received by the UE and transmit a quality message that includes the set of signal parameters measured by the UE. In some cases, the quality message is a resource response message.

Message manager 1125 may receive, via the shared radio frequency spectrum band, a targeted preamble that indicates resources to be used by the UE to communicate data, where the targeted preamble includes an instruction configured to silence an interference source during a transmission of data to the UE using the resources, the instruction including an indication of the interference source and the identified resources, another UE is scheduled to use at least a portion of resources associated with a transmission opportunity, where the portion of resources are different from the resources of the transmission opportunity used by the UE to receive data, receive a resource request message from a base station, broadcast a resource response message to a potential interference source indicating the subset of resources to be used for receiving data from the base station, transmit the data using the identified resources, receive data from the base station using the subset of resources, another UE is scheduled to use at least a portion of resources associated with the transmission opportunity, where the portion of resources are different from the resources of the transmission opportunity used by the UE to receive data, receive, by a network entity, a resource response message from a UE, and refrain from transmitting data using the subset of frequency resources included in the resource response message. In some cases, the network entity is scheduled to use at least a portion of frequency resources associated with the transmission opportunity, where the portion of frequency resources are different from the resources of the transmission opportunity used by the UE to receive data. In some cases, the resource response message includes a subset of frequency resources of the transmission opportunity for communication with the base station.

Resource manager 1130 may identify the interference source associated with the UE based on the set of signal parameters, identify a subset of resources of a transmission opportunity included in the resource request message to be used for receiving data from the base station, identify a subset of frequency resources of a transmission opportunity included in the resource response message to be used by the UE to communicate data, where the subset of frequency resources is less than a set of all resources associated with the transmission opportunity, compare the subset of frequency resources to a scheduled resources to be used by the network entity to communicate data, where refraining from transmitting data is based on the subset of frequency resources overlapping with the scheduled resources, and determine a bitmap value from information included in the resource response message, where identifying the subset of frequency resources is based on the bitmap value. In some cases, the resources include a subset of resources that is less than a set of all resources associated with a transmission opportunity. In some cases, the resources include a subset of frequency resources that is less than a set of all frequency resources associated with a transmission opportunity. In some cases, the subset of resources is less than a set of all resources associated with the transmission opportunity. In some cases, the subset of resources included in the resource response message indicate a subset of frequency resources different from frequency resources used to broadcast the resource response message.

Bitmap manager 1135 may determine a bitmap value of the subset of resources, where the resource response message includes the bitmap value indicating the subset of resources.

Figure 12:
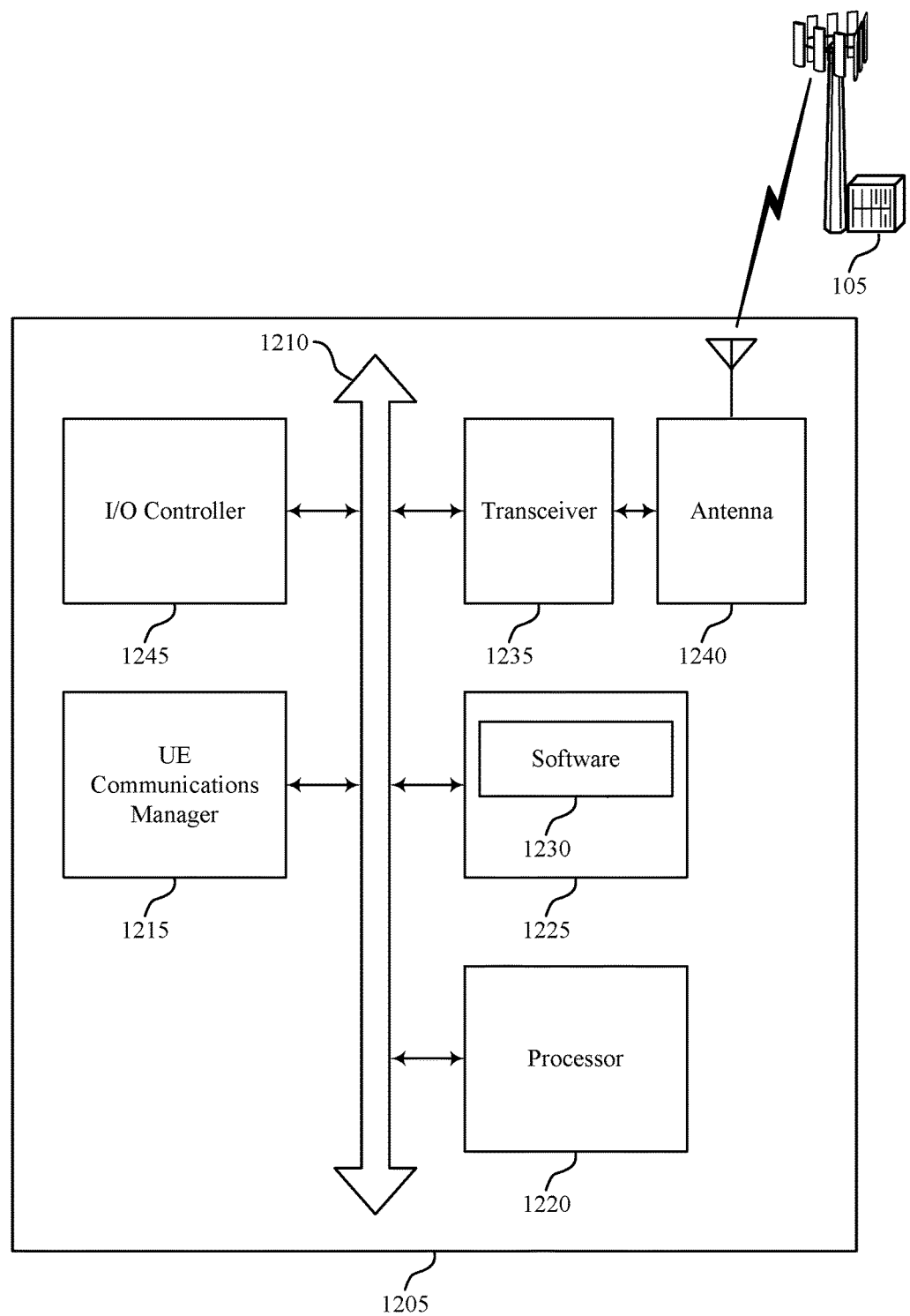
FIG. 12 illustrates a block diagram of a system including a UE that supports channel reservation for multi-user scheduling in accordance with aspects of the present disclosure.

FIG. 12 shows a diagram of a system 1200 including a device 1205 that supports channel reservation for multi-user scheduling in accordance with aspects of the present disclosure. Device 1205 may be an example of or include the components of UE 115 as described above, e.g., with reference to FIG. 1. Device 1205 may include components for bi-directional voice and data communications including components for transmitting and receiving communications, including UE communications manager 1215, processor 1220, memory 1225, software 1230, transceiver 1235, antenna 1240, and I/O controller 1245. These components may be in electronic communication via one or more busses (e.g., bus 1210). Device 1205 may communicate wirelessly with one or more base stations 105.

Processor 1220 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, processor 1220 may be configured to operate a memory array using a memory controller. In other cases, a memory controller may be integrated into processor 1220. Processor 1220 may be configured to execute computer-readable instructions stored in a memory to perform various functions (e.g., functions or tasks supporting channel reservation for multi-user scheduling).

Memory 1225 may include RAM and ROM. The memory 1225 may store computer-readable, computer-executable software 1230 including instructions that, when executed, cause the processor to perform various functions described herein. In some cases, the memory 1225 may contain, among other things, a BIOS which may control basic hardware and/or software operation such as the interaction with peripheral components or devices.

Software 1230 may include code to implement aspects of the present disclosure, including code to support channel reservation for multi-user scheduling. Software 1230 may be stored in a non-transitory computer-readable medium such as system memory or other memory. In some cases, the software 1230 may not be directly executable by the processor but may cause a computer (e.g., when compiled and executed) to perform functions described herein.

Transceiver 1235 may communicate bi-directionally, via one or more antennas, wired, or wireless links as described above. For example, the transceiver 1235 may represent a wireless transceiver and may communicate bi-directionally with another wireless transceiver. The transceiver 1235 may also include a modem to modulate the packets and provide the modulated packets to the antennas for transmission, and to demodulate packets received from the antennas.

In some cases, the wireless device may include a single antenna 1240. However, in some cases the device may have more than one antenna 1240, which may be capable of concurrently transmitting or receiving multiple wireless transmissions.

I/O controller 1245 may manage input and output signals for device 1205. I/O controller 1245 may also manage peripherals not integrated into device 1205. In some cases, I/O controller 1245 may represent a physical connection or port to an external peripheral. In some cases, I/O controller 1245 may utilize an operating system such as iOS®, ANDROID®, MS-DOS®, MS-WINDOWS®, OS/2®, UNIX®, LINUX®, or another known operating system. In other cases, I/O controller 1245 may represent or interact with a modem, a keyboard, a mouse, a touchscreen, or a similar device. In some cases, I/O controller 1245 may be implemented as part of a processor. In some cases, a user may interact with device 1205 via I/O controller 1245 or via hardware components controlled by I/O controller 1245.

Figure 13:
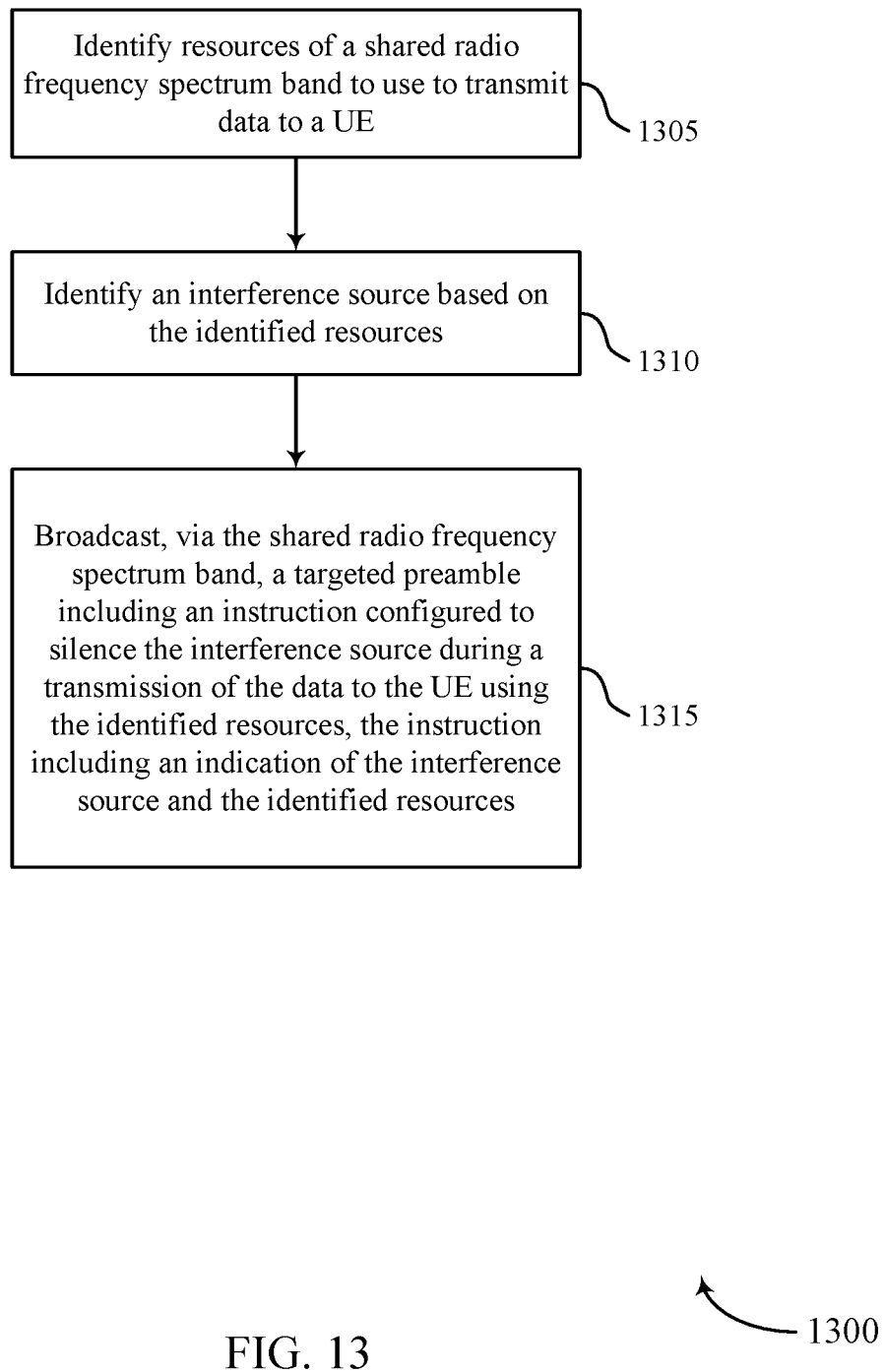
FIGS. 13 through 16 illustrate methods for channel reservation for multi-user scheduling in accordance with aspects of the present disclosure.

FIG. 13 shows a flowchart illustrating a method 1300 for channel reservation for multi-user scheduling in accordance with aspects of the present disclosure. The operations of method 1300 may be implemented by a base station 105 or its components as described herein. For example, the operations of method 1300 may be performed by a base station communications manager as described with reference to FIGS. 5 through 8. In some examples, a base station 105 may execute a set of codes to control the functional elements of the device to perform the functions described below. Additionally or alternatively, the base station 105 may perform aspects of the functions described below using special-purpose hardware.

At block 1305 the base station 105 may identify resources of a shared radio frequency spectrum band to use to transmit data to a UE. The operations of block 1305 may be performed according to the methods described herein. In certain examples, aspects of the operations of block 1305 may be performed by a resource manager as described with reference to FIGS. 5 through 8.

At block 1310 the base station 105 may identify an interference source based at least in part on the identified resources. The operations of block 1310 may be performed according to the methods described herein. In certain examples, aspects of the operations of block 1310 may be performed by an interference manager as described with reference to FIGS. 5 through 8.

At block 1315 the base station 105 may broadcast, via the shared radio frequency spectrum band, a targeted preamble comprising an instruction configured to silence the interference source during a transmission of the data to the UE using the identified resources, the instruction comprising an indication of the interference source and the identified resources. The operations of block 1315 may be performed according to the methods described herein. In certain examples, aspects of the operations of block 1315 may be performed by a message manager as described with reference to FIGS. 5 through 8.

Figure 14:
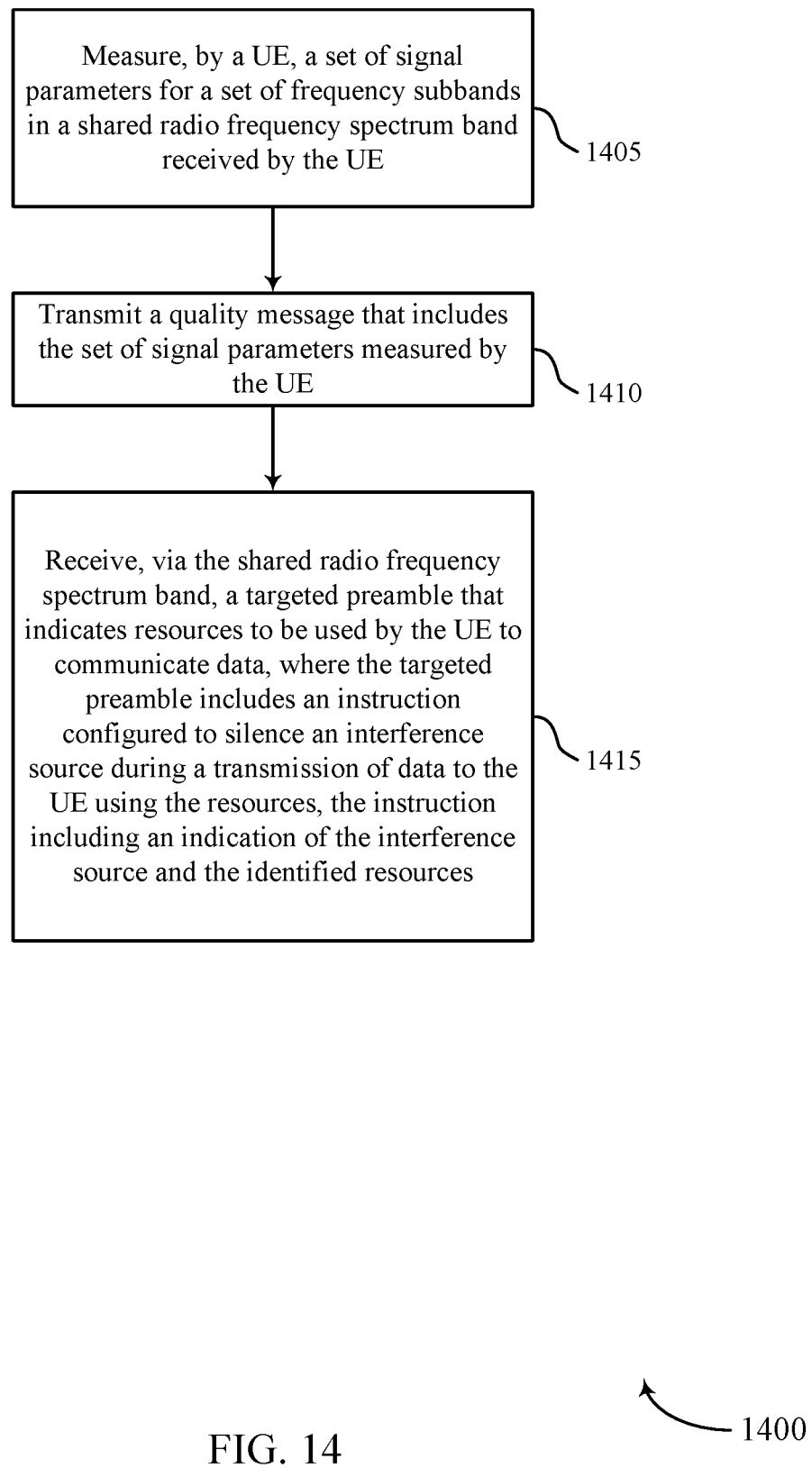

FIG. 14 shows a flowchart illustrating a method 1400 for channel reservation for multi-user scheduling in accordance with aspects of the present disclosure. The operations of method 1400 may be implemented by a UE 115 or its components as described herein. For example, the operations of method 1400 may be performed by a UE communications manager as described with reference to FIGS. 9 through 12. In some examples, a UE 115 may execute a set of codes to control the functional elements of the device to perform the functions described below. Additionally or alternatively, the UE 115 may perform aspects of the functions described below using special-purpose hardware.

At block 1405 the UE 115 may measure, by a UE, a plurality of signal parameters for a plurality of frequency subbands in a shared radio frequency spectrum band received by the UE. The operations of block 1405 may be performed according to the methods described herein. In certain examples, aspects of the operations of block 1405 may be performed by a signal manager as described with reference to FIGS. 9 through 12.

At block 1410 the UE 115 may transmit a quality message that includes the plurality of signal parameters measured by the UE. The operations of block 1410 may be performed according to the methods described herein. In certain examples, aspects of the operations of block 1410 may be performed by a signal manager as described with reference to FIGS. 9 through 12.

At block 1415 the UE 115 may receive, via the shared radio frequency spectrum band, a targeted preamble that indicates resources to be used by the UE to communicate data, wherein the targeted preamble comprises an instruction configured to silence an interference source during a transmission of data to the UE using the resources, the instruction comprising an indication of the interference source and the identified resources. The operations of block 1415 may be performed according to the methods described herein. In certain examples, aspects of the operations of block 1415 may be performed by a message manager as described with reference to FIGS. 9 through 12.

Figure 15:
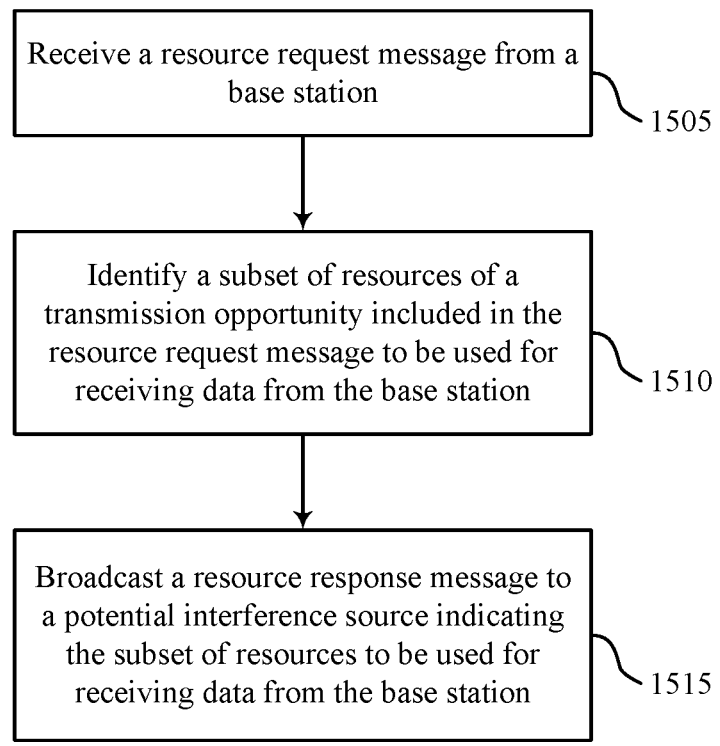

FIG. 15 shows a flowchart illustrating a method 1500 for channel reservation for multi-user scheduling in accordance with aspects of the present disclosure. The operations of method 1500 may be implemented by a UE 115 or its components as described herein. For example, the operations of method 1500 may be performed by a UE communications manager as described with reference to FIGS. 9 through 12. In some examples, a UE 115 may execute a set of codes to control the functional elements of the device to perform the functions described below. Additionally or alternatively, the UE 115 may perform aspects of the functions described below using special-purpose hardware.

At block 1505 the UE 115 may receive a resource request message from a base station. The operations of block 1505 may be performed according to the methods described herein. In certain examples, aspects of the operations of block 1505 may be performed by a message manager as described with reference to FIGS. 9 through 12.

At block 1510 the UE 115 may identify a subset of resources of a transmission opportunity included in the resource request message to be used for receiving data from the base station. The operations of block 1510 may be performed according to the methods described herein. In certain examples, aspects of the operations of block 1510 may be performed by a resource manager as described with reference to FIGS. 9 through 12.

At block 1515 the UE 115 may broadcast a resource response message to a potential interference source indicating the subset of resources to be used for receiving data from the base station. The operations of block 1515 may be performed according to the methods described herein. In certain examples, aspects of the operations of block 1515 may be performed by a message manager as described with reference to FIGS. 9 through 12.

Figure 16:
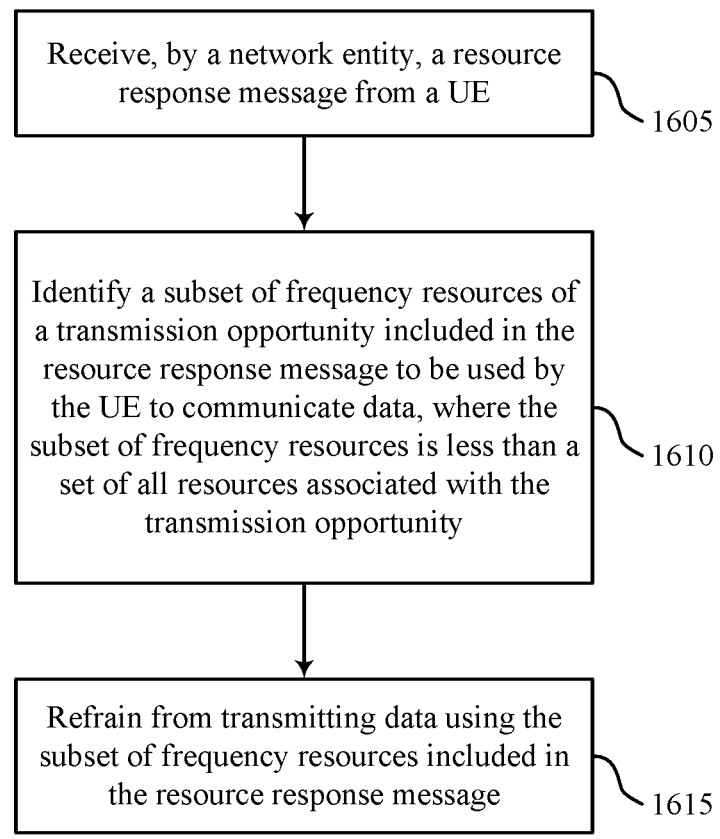

FIG. 16 shows a flowchart illustrating a method 1600 for channel reservation for multi-user scheduling in accordance with aspects of the present disclosure. The operations of method 1600 may be implemented by a UE 115 or its components as described herein. For example, the operations of method 1600 may be performed by a UE communications manager as described with reference to FIGS. 9 through 12. In some examples, a UE 115 may execute a set of codes to control the functional elements of the device to perform the functions described below. Additionally or alternatively, the UE 115 may perform aspects of the functions described below using special-purpose hardware.

At block 1605 the UE 115 may receive, by a network entity, a resource response message from a UE. The operations of block 1605 may be performed according to the methods described herein. In certain examples, aspects of the operations of block 1605 may be performed by a message manager as described with reference to FIGS. 9 through 12.

At block 1610 the UE 115 may identify a subset of frequency resources of a transmission opportunity included in the resource response message to be used by the UE to communicate data, wherein the subset of frequency resources is less than a set of all resources associated with the transmission opportunity. The operations of block 1610 may be performed according to the methods described herein. In certain examples, aspects of the operations of block 1610 may be performed by a resource manager as described with reference to FIGS. 9 through 12.

At block 1615 the UE 115 may refrain from transmitting data using the subset of frequency resources included in the resource response message. The operations of block 1615 may be performed according to the methods described herein. In certain examples, aspects of the operations of block 1615 may be performed by a message manager as described with reference to FIGS. 9 through 12.

In some examples, aspects from two or more of the methods 1300, 1400, 1500, or 1600 described with reference to FIGS. 13, 14, 15, and 16 are just example implementations and that the operations of the methods 1300, 1400, 1500, or 1600 may be rearranged or otherwise modified such that other implementations are possible.

Techniques described herein may be used for various wireless communications systems such as code division multiple access (CDMA), time division multiple access (TDMA), frequency division multiple access (FDMA), orthogonal frequency division multiple access (OFDMA), single carrier frequency division multiple access (SC-FDMA), and other systems. The terms "system" and "network" are often used interchangeably. A code division multiple access (CDMA) system may implement a radio technology such as CDMA2000, Universal Terrestrial Radio Access (UTRA), etc. CDMA2000 covers IS-2000, IS-95, and IS-856 standards. IS-2000 Releases may be commonly referred to as CDMA2000 1x, 1x, etc. IS-856 (TIA-856) is commonly referred to as CDMA2000 1xEV-DO, High Rate Packet Data (HRPD), etc. UTRA includes Wideband CDMA (WCDMA) and other variants of CDMA. A TDMA system may implement a radio technology such as Global System for Mobile Communications (GSM).

An OFDMA system may implement a radio technology such as Ultra Mobile Broadband (UMB), Evolved UTRA (E-UTRA), IEEE 802.11 (Wi-Fi), IEEE 802.16 (WiMAX), IEEE 802.20, Flash-OFDM, etc. UTRA and E-UTRA are part of Universal Mobile Telecommunications System (UMTS). LTE and LTE-A are releases of UMTS that use E-UTRA. UTRA, E-UTRA, UMTS, LTE, LTE-A, NR, and GSM are described in documents from the organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned above as well as other systems and radio technologies. While aspects of an LTE or an NR system may be described for purposes of example, and LTE or NR terminology may be used in much of the description, the techniques described herein are applicable beyond LTE or NR applications.

In LTE/LTE-A networks, including such networks described herein, the term evolved node B (eNB) may be generally used to describe the base stations. The wireless communications system or systems described herein may include a heterogeneous LTE/LTE-A or NR network in which different types of eNBs provide coverage for various geographical regions. For example, each eNB, next generation NodeB (gNB), or base station may provide communication coverage for a macro cell, a small cell, or other types of cell. The term "cell" may be used to describe a base station, a carrier or component carrier associated with a base station, or a coverage area (e.g., sector, etc.) of a carrier or base station, depending on context.

Base stations may include or may be referred to by those skilled in the art as a base transceiver station, a radio base station, an access point, a radio transceiver, a NodeB, eNodeB (eNB), gNB, Home NodeB, a Home eNodeB, or some other suitable terminology. The geographic coverage area for a base station may be divided into sectors making up only a portion of the coverage area. The wireless communications system or systems described herein may include base stations of different types (e.g., macro or small cell base stations). The UEs described herein may be able to communicate with various types of base stations and network equipment including macro eNBs, small cell eNBs, gNBs, relay base stations, and the like. There may be overlapping geographic coverage areas for different technologies.

A macro cell generally covers a relatively large geographic area (e.g., several kilometers in radius) and may allow unrestricted access by UEs with service subscriptions with the network provider. A small cell is a lower-powered base station, as compared with a macro cell, that may operate in the same or different (e.g., licensed, unlicensed, etc.) frequency bands as macro cells. Small cells may include pico cells, femto cells, and micro cells according to various examples. A pico cell, for example, may cover a small geographic area and may allow unrestricted access by UEs with service subscriptions with the network provider. A femto cell may also cover a small geographic area (e.g., a home) and may provide restricted access by UEs having an association with the femto cell (e.g., UEs in a closed subscriber group (CSG), UEs for users in the home, and the like). An eNB for a macro cell may be referred to as a macro eNB. An eNB for a small cell may be referred to as a small cell eNB, a pico eNB, a femto eNB, or a home eNB. An eNB may support one or multiple (e.g., two, three, four, and the like) cells (e.g., component carriers).

The wireless communications system or systems described herein may support synchronous or asynchronous operation. For synchronous operation, the base stations may have similar frame timing, and transmissions from different base stations may be approximately aligned in time. For asynchronous operation, the base stations may have different frame timing, and transmissions from different base stations may not be aligned in time. The techniques described herein may be used for either synchronous or asynchronous operations.

The downlink transmissions described herein may also be called forward link transmissions while the uplink transmissions may also be called reverse link transmissions. Each communication link described herein—including, for example, wireless communications system 100 and 200 of FIGS. 1 and 2—may include one or more carriers, where each carrier may be a signal made up of multiple sub-carriers (e.g., waveform signals of different frequencies).

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label.

Information and signals described herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, an FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations. Also, as used herein, including in the claims, "or" as used in a list of items (for example, a list of items prefaced by a phrase such as "at least one of" or "one or more of") indicates an inclusive list such that, for example, a phrase referring to "at least one of" a list of items refers to any combination of those items, including single members. As an example, "at least one of: A, B, or C" is intended to cover A, B, C, A-B, A-C, B-C, and A-B-C, as well as any combination with multiples of the same element (e.g., A-A A-A-A, A-A-B, A-A-C, A-B-B, A-C-C, B-B, B-B-B, B-B-C, C-C, and C-C-C or any other ordering of A, B, and C).

Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on." Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media may comprise RAM, ROM, electrically erasable programmable read only memory (EEPROM), compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digitalSP subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for wireless communication, comprising:
measuring, by a user equipment (UE), a plurality of signal parameters for a plurality of frequency subbands in a shared radio frequency spectrum band received by the UE;
transmitting, by the UE, a quality message that includes the plurality of signal parameters measured by the UE; and
receiving, by the UE from a base station via the shared radio frequency spectrum band, a targeted preamble that indicates resources to be used by the UE to communicate data, wherein the targeted preamble comprises an instruction configured to silence an interference source during a transmission of data to the UE using the resources, the instruction comprising an indication of the interference source and the identified resources.

2. The method of claim 1, further comprising:
identifying the interference source associated with the UE based at least in part on the plurality of signal parameters.

3. The method of claim 1, further comprising:
transmitting the data using the identified resources.

4. The method of claim 1, wherein the quality message is a resource response message.

5. The method of claim 1, wherein the resources include a subset of resources that is less than a set of all resources associated with a transmission opportunity.

6. The method of claim 1, wherein the resources include a subset of frequency resources that is less than a set of all frequency resources associated with a transmission opportunity.

7. The method of claim 1, further comprising:
another UE is scheduled to use at least a portion of resources associated with a transmission opportunity, wherein the portion of resources are different from the resources of the transmission opportunity used by the UE to receive data.

8. A method for wireless communication, comprising:
receiving, by a user equipment (UE), a resource request message from a base station;
identifying, by the UE, a subset of resources of a transmission opportunity included in the resource request message to be used for receiving data from the base station;
broadcasting, by the UE, a resource response message to a potential interference source indicating the subset of resources to be used for receiving data from the base station; and
receiving, by the UE, data from the base station using the subset of resources.

9. The method of claim 8, wherein the resource response message includes a subset of frequency resources of the transmission opportunity for communication with the base station.

10. The method of claim 8, further comprising:
determining a bitmap value of the subset of resources, wherein the resource response message includes the bitmap value indicating the subset of resources.

11. The method of claim 8, wherein the subset of resources is less than a set of all resources associated with the transmission opportunity.

12. The method of claim 8, wherein another UE is scheduled to use at least a portion of resources associated with the transmission opportunity, wherein the portion of resources are different from the resources of the transmission opportunity used by the UE to receive data.

13. The method of claim 8, wherein the subset of resources included in the resource response message indicate a subset of frequency resources different from frequency resources used to broadcast the resource response message.

14. A method for wireless communication, comprising:
receiving, by a network entity, a resource response message from a user equipment (UE);
identifying a subset of frequency resources of a transmission opportunity included in the resource response message to be used by the UE to communicate data, wherein the subset of frequency resources is less than a set of all resources associated with the transmission opportunity;
comparing the subset of frequency resources to scheduled resource to be used by the network entity to communicate data; and
refraining, based at least in part on the subset of frequency resources overlapping with the scheduled resources, from transmitting data using the subset of frequency resources included in the resource response message.

15. The method of claim 14, further comprising:
determining a bitmap value from information included in the resource response message, wherein identifying the subset of frequency resources is based at least in part on the bitmap value.

16. The method of claim 14, wherein the network entity is scheduled to use at least a portion of frequency resources associated with the transmission opportunity, wherein the portion of frequency resources are different from the resources of the transmission opportunity used by the UE to receive data.

17. An apparatus for wireless communication, comprising:

a processor;
memory in electronic communication with the processor; and
instructions stored in the memory, wherein the instructions are executable by the processor to:
receive, by a user equipment (UE), a resource request message from a base station;
identify, by the UE, a subset of resources of a transmission opportunity included in the resource request message to be used for receiving data from the base station;
broadcast, by the UE, a resource response message to a potential interference source indicating the subset of resources to be used for receiving data from the base station; and
receive data from the base station using the subset of resources.

18. The apparatus of claim 17, wherein the resource response message includes a subset of frequency resources of the transmission opportunity for communication with the base station.

19. The apparatus of claim 17, wherein the instructions are further executable by the processor to:
determine a bitmap value of the subset of resources, wherein the resource response message includes the bitmap value indicating the subset of resources.

20. The apparatus of claim 17, wherein:
the subset of resources is less than a set of all resources associated with the transmission opportunity.

21. The apparatus of claim 17, wherein:
another UE is scheduled to use at least a portion of resources associated with the transmission opportunity, wherein the portion of resources are different from the resources of the transmission opportunity used by the UE to receive data.

22. The apparatus of claim 17, wherein:
the subset of resources included in the resource response message indicate a subset of frequency resources different from frequency resources used to broadcast the resource response message.

* * * * *